United States Patent [19]

Cohen

[11] Patent Number: 5,506,956
[45] Date of Patent: Apr. 9, 1996

[54] ERROR CORRECTION AND CHANNEL RESTORATION APPARATUS FOR T1 DIGITAL LINKS

[75] Inventor: Aaron Y. Cohen, Potomac, Md.

[73] Assignee: Sprint Communications Company L.P., Kansas City, Mo.

[21] Appl. No.: 44,327

[22] Filed: Apr. 7, 1993

[51] Int. Cl.$^6$ .................................................. G06F 11/34
[52] U.S. Cl. .................................. 395/182.04; 371/68.2
[58] Field of Search .............................. 371/8.2, 37.1,
371/37.7, 25.1, 8.1, 7, 9.1, 20.4, 11.1, 30,
11.2, 20.1; 370/58.1, 13, 14, 15, 16, 17;
395/575, 427, 725, 182.04; 375/10

[56] References Cited

U.S. PATENT DOCUMENTS

| | | | |
|---|---|---|---|
| Re. 33,900 | 4/1992 | Howson | 370/105 |
| 3,991,407 | 11/1976 | Jordan, Jr. et al. | 340/172.5 |
| 4,119,815 | 10/1978 | Frankfort et al. | 179/175.3 |
| 4,348,554 | 9/1982 | Asmuth | 179/18 |
| 4,371,754 | 2/1983 | De et al. | 179/18 EE |
| 4,435,704 | 3/1984 | Hashimoto et al. | 340/825.01 |
| 4,486,882 | 12/1984 | Piret et al. | 371/45 |
| 4,625,314 | 11/1986 | Witte | 371/68 |
| 4,674,085 | 6/1987 | Aranguren et al. | 370/85 |
| 4,774,703 | 9/1988 | Force et al. | 370/16 |
| 4,780,869 | 10/1988 | Engdahl et al. | 370/16 |
| 4,794,604 | 12/1988 | Gorshe | 371/57 |
| 4,819,225 | 4/1989 | Hochstein | 370/16 |
| 4,835,763 | 5/1989 | Lau | 370/16 |
| 4,847,837 | 7/1989 | Morales et al. | 371/8 |
| 4,852,103 | 7/1989 | Fujimura | 371/55 |
| 4,903,125 | 2/1990 | Parker | 358/141 |
| 4,924,500 | 5/1990 | Lewis et al. | 379/201 |
| 4,943,999 | 7/1990 | Ardon | 379/221 |
| 4,964,120 | 10/1990 | Mostashari | 370/16 |
| 4,972,415 | 11/1990 | Walter et al. | 371/36 |
| 4,993,014 | 2/1991 | Gordon | 370/16 |

(List continued on next page.)

OTHER PUBLICATIONS

United States Patent Application 07/805,340—Aaron Y. Cohen, Art Unit 2313, Filed Dec. 9, 1991.
United States Patent Application 08/044,348—Daniel D. Peer, Art Unit 2305, filed Apr. 7, 1993.
"Digital Cross–Connect System Requirements and Objectives", *Bell Communications Research, Technical Reference, TR–TSY–000170*. Issue 1, Nov. 1985 (Bellcore publication No. 1).
"Extended Superframe Format (ESF), Interface Specifications", *Bell Communications Research, Technical Reference, TR–TSY–000194*, Issue 1, Jul. 1987 (Bellcore publication No. 2).
"The Book on ESF", Verilink Corporation, 1986.
"New Product Preview Model 4701 DS1 Automatic Protection Switch," *Digital Transmission Systems, Inc.*

*Primary Examiner*—Robert W. Beausoliel, Jr.
*Assistant Examiner*—Phung My Chung
*Attorney, Agent, or Firm*—Harley R. Ball; Michael J. Setter

[57] ABSTRACT

Apparatus, operating in a digital communication system, for interconnecting a primary or a secondary network to an output port. The primary and secondary networks are redundant networks having point-to-point topologies (125, 130) or point-to-multi-point topologies (210, 215). When connected in a point-to-point network topology that supports extended superframe format (ESF), the apparatus functions as an error correction switch and; when connected in a point-to-multi-point network topology, the apparatus functions as a DS1/0 protection switch. In its receiver aspect, the apparatus stores frames of digital data received from each of two redundant networks, inspects certain error codes contained in the received data and, in response to these error codes, selects the digital data originating from one of the networks that does not exhibit an error code. The data selection process uses a time-slot interchanging (TSI) technique. The selected data is subsequently transferred to downstream digital signal processing equipment. In its transmitter aspect, the apparatus transmits replicated versions of digital data supplied by digital transmission equipment onto both redundant networks.

8 Claims, 12 Drawing Sheets

U.S. PATENT DOCUMENTS

| | | | |
|---|---|---|---|
| 4,993,015 | 2/1991 | Fite, Jr. | 370/16 |
| 5,115,449 | 5/1992 | Lockyer et al. | 371/8.2 |
| 5,153,578 | 10/1992 | Izawa et al. | 340/825.21 |
| 5,187,711 | 2/1993 | Hodohara | 371/7 |
| 5,200,950 | 4/1993 | Foglar et al. | 370/16 |
| 5,241,534 | 8/1993 | Omuro et al. | 370/16 |
| 5,285,441 | 2/1994 | Bansal et al. | 370/16 |
| 5,301,184 | 4/1994 | Uriu et al. | 370/16 |
| 5,315,581 | 5/1994 | Nakano et al. | 370/16 |
| 5,329,521 | 7/1994 | Walsh et al. | 371/8.2 |
| 5,335,232 | 8/1994 | Suzuki et al. | 371/20.4 |
| 5,343,477 | 8/1994 | Yamada | 371/8.2 |
| 5,347,271 | 9/1994 | Iwasaki | 371/8.2 |

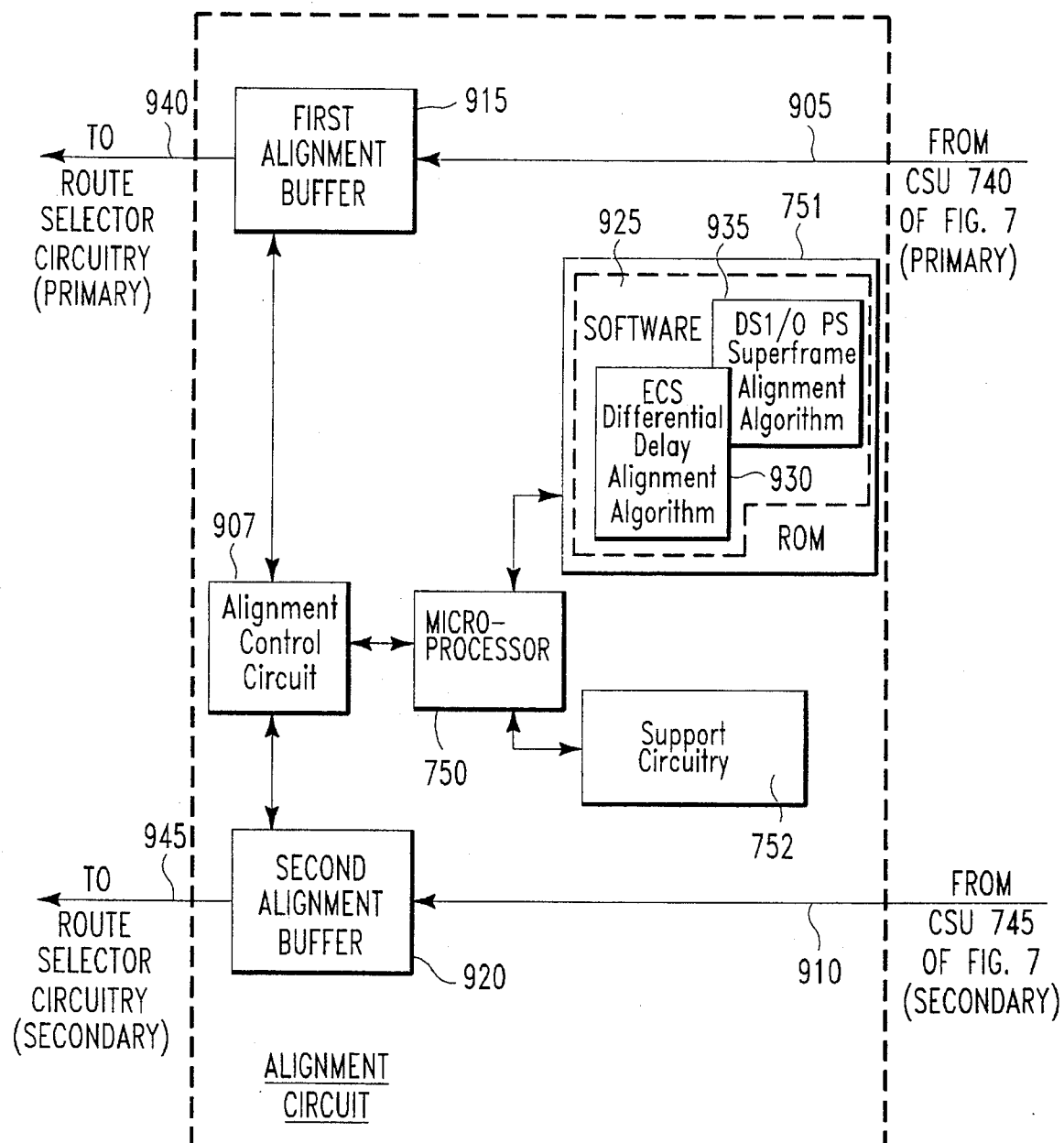
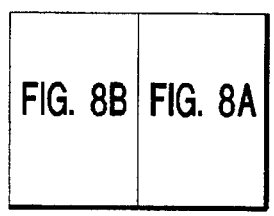
FIG. 8A
FIG. 8

ERROR CORRECTION AND CHANNEL RESTORATION APPARATUS FOR T1 DIGITAL LINKS

CROSS-REFERENCE TO RELATED APPLICATIONS

This application describes material described and claimed in co-pending United States patent applications entitled "Intelligent Digital Signal Hitless Protection Switch" filed Apr. 7, 1993, Ser. No. 08/044,348, and "Automatic Restoration of Fractional DS1 Channels Carried Over DS1 Digital Links", filed Dec. 9, 1991, Ser. No. 07/805,340; both of which have been assigned to the present assignee hereof.

BACKGROUND OF THE INVENTION

1. Field of the Invention

This invention relates generally to digital communication networks and, more specifically, to apparatus for providing highly reliable, substantially error-free communication on T1 links for use in, preferably, private communication networks.

2. Description of the Prior Art

Since the introduction of time-division multiplexed signals into North American telecommunication networks in the 1960's, a sophisticated time-division multiplexed signal hierarchy has evolved based on a so-called T1 format. This format represents a type of transmission scheme that is capable of supporting 24 time-division multiplexed voice channels organized into 24 time-slots on a single physical transmission facility or T1 link. In the traditional T1 format, a 64 Kbps signal carried by each time-slot represents each voice channel. However, lately the T1 format is increasingly used for digital data transmission as well as the traditional voice channel transmission. As such, each 64 Kbps signal carried by each time-slot can also represent a data channel. Both digital and analog facilities are used to propagate T1 formatted time-division multiplexed signals. Typically, a digital communication link or facility which carries T1 formatted signals is known as a DS1 link. As such, the term DS1 refers only to the digital signals in the T1 format.

Generally, T1 links are designed as having a network topology that is either point-to-point or point-to-multi-point. In the point-to-point network topology, all 24 channels that originate at one customer site terminate at a single customer site at a far end location in the network. By comparison, in the point-to-multi-point network topology, not all 24 channels that originate at one customer site terminate at a single customer site at a far end location in the network. In other words, the 24 channels originating at one customer site may be destined for multiple far end customer sites. Typically, telecommunications system customers will use both types of topologies to exchange data with various geographically diverse sites.

Customer premise equipment known as protection switches are used for special applications that require enhanced transmission link availability. The protection switch used in a point-to-point network topology is known as an error correction switch (ECS). The protection switch used in a point-to-multi-point network topology is known as a DS1/0 protection switch (DS1/0 PS). In general, each protection switch type utilizes redundant T1 communication links, actively monitors these links, and, upon failure of any of these links, provides automatic restoration of telecommunication services using a back-up T1 link, i.e. one of the redundant links.

Before discussing the details of the protection switch circuitry used in the art, it is necessary to trace pertinent aspects of the evolution of digital transmission networks as they are used in each topology so as to provide a context for presenting and discussing the relevant art. First, the point-to-point network topology is described, followed by a description of a point-to-multi-point network topology. To enhance understanding, each such description includes a discussion of associated protection switch circuitry.

In the original T1 format used in point-to-point network topologies, 24 voice-frequency signals are sampled and then multiplexed into a bit stream, thereby forming 24 autonomous voice-frequency channels known as DS0's or DS0 channels. Each voice-frequency channel is allocated 8 bits in each T1 frame; these 8 bits represent one encoded sample of a particular voice signal as well as signaling information. Specifically, seven out of eight DS0 bits in each slot are used to represent encoded voice with one additional bit being used exclusively for signaling. All 24 channels are grouped together and arranged in 24 sequential time-slots to form a 192-bit data group. For synchronization, every group of 192 bits is preceded by a framing bit. The resulting 193 bits comprise a T1 frame. Thus, a T1 frame is composed of 192 bits of information and one overhead framing bit. Consequently, since the sampling rate of the voice-frequency signal is 8 kHz, meaning that each voice-frequency signal must be sampled 8000 times a second, the transmission rate of the T1 system is 1.544 Mbits/sec. To support two-way communication, two digital bit streams are generated—one for each direction of transmission. Each bit stream is transmitted over a corresponding unidirectional link typically composed of a wire-pair cable and interposed repeaters so that a complete T1 system utilizes two wire-pair cables. At each end of the wire-pair cables, T1 terminals known as D1 channel banks, were used to multiplex the 24 voice-frequency signals.

As technology evolved, additional framing formats were devised to improve the performance of the underlying T1 system. For example, the D2 frame format introduced the so-called superframe wherein 12 contiguous T1 frames were sequentially grouped to form the superframe. A unique 193rd bit sequence was repeated once every 12 frames, i.e., for each superframe. The D2 framing format also introduced so-called "robbed bit" signaling. Specifically, in each DS0 channel, only one bit, just in frames 6 and 12, was used for signaling. The remaining bits were allocated to encode customer voice. The use of all eight bits for digitized voice in 10 out of 12 frames resulted in substantial improvement of voice transmission quality compared to the D1 framing format. D1D, which followed D2, made the superframe concept "backward compatible" with the original D1 type channel banks. The last frame format to utilize a 12-frame superframe concept was the D4 frame format. The most recent framing format, designated the Extended Superframe Format (ESF), dramatically improves the capabilities of T1 systems and affords an opportunity to perform in-service end-to-end error performance monitoring on working T1 systems. Because of technology improvements, fewer bytes are now required to maintain frame synchronization as compared to the D4 framing format. In ESF, a 24-frame sequence is used for framing, in-service, end-to-end performance monitoring, and facility data link (FDL) that allows communication on the T1 link independent of the customer data traffic. FLD channel has been designed to allow the carrier to provide in-service maintenance of T1 facilities.

The fundamentals of ESF will be discussed in more detail shortly after the types of errors that arise in a T1 system are discussed.

A T1 bit stream, that is, a stream of T1 frames, must follow certain propagation rules. First, when bits of the T1 signal propagate over the communication medium, each "1" bit must correspond to a pulse having a polarity opposite to the polarity of the previous "1" bit—this format generates a bipolar signal composed of a stream having alternating positive and negative electrical pulses. For each "0" bit, no electrical pulse is propagated. Such a bipolar signal leads to spectral efficiency, and also results in a frequency spectrum lacking a DC component, thereby requiring only AC-coupled circuitry. Second, to maintain signal synchronization, no more than a certain number of "0" bits can be transmitted consecutively. A logic error occurs if a "1" bit appears where a "0" bit should occur, and vice versa. A format error occurs when there is a violation in the bipolar nature of the pulse stream, an error in the framing bits, or an excessive number of "0" bits occur.

For all frame formats existing prior to the introduction of ESF, e.g., the D4 framing format, in-service performance monitoring was limited to checking for format errors. The basic assumption was that any logic error caused a format error. However, only certain logic errors cause format errors. For instance, if two consecutive "1" bits in a bit stream, e.g., a positive pulse followed by a negative pulse, are converted to "0" bits, then no format errors occur since there are no bipolar violations. However, two logic errors have occurred. In addition, a typical T1 circuit is likely to regenerate bipolar signals a number of times before the signal reaches a destination receiver. For example, a higher order M13 multiplexer combines several T1 signals into a T3 fiber link. Since fiber does not carry bipolar signals, the M13 multiplexer must regenerate the bipolar signals each time the signal from the fiber is demultiplexed from T3 to T1. Upon demultiplexing, any bipolar violations that may exist are "corrected". As a result, a channel bank at the other end of the T1 link can monitor bipolar violations, but this will reveal only bipolar violations that occurred in the last leg of the path from the last M13 multiplexer (i.e., bipolar pulse source) to the channel bank. Thus, end-to-end error performance monitoring cannot be provided with D4 framing format. Obviously, a need has existed for some time to develop a technique which could accurately detect end-to-end performance of an in-service T1 system.

This need was satisfied by the development of the ESF concept. With respect to the principles of ESF, each superframe is defined as encompassing 24 T1 frames, such that each ESF superframe is composed of 24×193=4632 bits, including 4608 information carrying payload bits and 24 overhead bits in the 193rd bit position. T1 frames of a conventional T1 system are conveyed at an effective rate of 8000 bps. Accordingly, the 24 overhead bit positions in the ESF superframe occupied by the 193rd bit in each of the 24 underlying T1 frames are also conveyed at the same rate of 8000 bps.

However, because of the aforementioned advances in technology, ESF superframe synchronization requires only six of the 24 overhead bits. Thus, if the 24 ESF overhead bits are extracted from the 4632-bit ESF superframe and arranged serially to create an ESF framing bit sequence, then the ESF superframe synchronization bits are conveyed by every fourth bit in the ESF framing bit sequence, that is, in an ESF superframe synchronization sub-sequence. The ESF superframe synchronization bits have a fixed bit pattern which conventionally has been set at "001011". It is important to reiterate at this point that the framing bit sequence is an overhead portion of the ESF superframe that is used to carry user information data and signaling data. Additionally, the information bits are unaffected by what is being conveyed in the ESF framing bit sequence.

The remaining 18 bits in the ESF frame sequence are partitioned into a check sub-sequence of 6 bits and a facility data link (FDL) sub-sequence of 12 bits. The check sub-sequence is of particular relevance to the present invention.

As indicated above, the primary reason for devising the ESF technique was to enable T1 users/suppliers to accurately measure end-to-end error performance of a T1 system while the system is on-line, that is, without interrupting propagation of the T1 bit stream. This is accomplished by applying a coding theory technique, called Cyclic Redundancy Codes (CRC), to each ESF superframe. With the CRC technique, all 4608 payload bits in each complete ESF superframe can be checked for logic errors. In essence, for the particular CRC technique used in the ESF (called CRC-6), six bits are generated for each ESF superframe; these six bits are indicative of the actual 4608 information bits comprising a given ESF superframe.

Computation of the six check bits merely involves modulo-2 division. For example, assume that the ESF superframe, rather than containing 4608 information bits, contains 10 bits and the pattern is "1010101010", which has a decimal equivalent of 682. This decimal equivalent is divided by "111111" which is a decimal equivalent of 64 ($2^6$ =64, that is, 6 bits are dedicated to the check subsegment), resulting in a decimal quotient of 10 and a decimal remainder of 42. The quotient is ignored, and the six-bit binary equivalent of the remainder, i.e., 42, namely, "101010" are the check bits transmitted in the next superframe. For ease of understanding, the foregoing example used base 10 arithmetic to generate the check bits. In practice, the check bits are generated using modulo-2 arithmetic.

To visualize the flow of bits in a temporal sequence, consider a time sequence of two ESF superframes designated the first ESF superframe and the second ESF superframe, wherein the latter superframe follows the former in time. The six check bits computed for the first ESF superframe are entered into the check sub-sequence of the second ESF superframe and transmitted to the receiving end of the T1 system. At the receiving end, the CRC-6 code of the first ESF superframe is dynamically computed. Obviously all 4608 information bits of the first ESF superframe are needed to compute the code bits, so the CRC-6 code cannot be completed until all bits arrive at the receiving end. Once computed, the CRC-6 code bits can then be compared to the check sub-sequence arriving in the second ESF superframe. If a match occurs, then it is concluded with a high degree of confidence that there were no errors in the information bits contained in the first ESF superframe. If there is not a match, this is normally taken to mean that at least one logical error occurred in the information bits of the first ESF superframe. (Of course, the check bits in the second superframe may have been corrupted, but the probability of this occurring, i.e., errors in the six bit positions, is much less than the occurrence of errors in 4608 payload bit positions.) The unfolding nature of error checking for the general case is now readily discernible: the CRC-6 code bits of a given superframe are transmitted in the check sub-sequence of the next superframe following the given ESF superframe.

Representative of prior art devices and equipment which exploit the capabilities of error detection using CRC-6 codes with ESF superframes is the Automatic Protection Logic Switch (APLS) available from the Verilink Corporation located in San Jose, Calif. The APLS checks a working T1 line for logic errors, and when a preset Bit Error Rate (BER) threshold is reached or an active link outage is detected, traffic is automatically switched from the active T1 link to a standby T1 link. Such an arrangement is deficient, however, because the protection link (stand-by link) is activated only after errors occur and the BER threshold is reached. Consequently, all errors which occurred in the active link prior to the activation of the protection link reach the end-user. Also, a difference in the propagation delay exists between the active and protection links. When the protection link is activated, the end-user will encounter a "hit" in the data stream; this "hit" is usually in the form of a gap in the data stream or a repeated segment in the data stream.

Recent developments in the art have produced an arrangement and concomitant methodology which equalizes the propagation delays of an active T1 link and a protection T1 link and utilizes the protection T1 link to correct errors in the active T1 link. The equalization of the propagation delays achieves "hitless" protection switching when the active T1 link fails—as distinct from the sequence in the prior art of error-detection first, then subsequent protection switching to the alternate facility only after a period of delay. One such "hitless" protection switch known as an Error Correction Switch (ECS) is disclosed in United States patent application entitled "Intelligent Digital Signal Hitless Protection Switch" filed Apr. 7, 1993, and accorded Ser. No. 08/044,348, and which is incorporated by reference herein and assigned to the present assignee hereof.

Due to the manner in which the CRC-6 coding is computed, i.e., a single code corresponds to all 4608 information bits carried by an ESF superframe, the protection switches that capitalize on the existence of the CRC-6 coding in the ESF superframes are generally limited to use in point-to-point T1 telecommunications links between individual customer sites. Typically, dedicated hardware, such as the "hitless" protection switch discussed above, is used to provide enhanced availability and error correction of T1 links. However, the hardware and software used to provide protection for point-to-point T1 communications is typically not equivalent to the hardware and software used to provide protection for point-to-multi-point T1 communications. Thus, as discussed below, separate and independent protection hardware is typically used at each customer site in point-to-multi-point network topologies.

As alluded to above, in addition to having a point-to-point T1 communications link between two customer sites, many telecommunication customers utilize additional T1 access facilities at a customer site to communicate with multiple customer sites, i.e., a point-to-multi-point network topology. In such point-to-multi-point network topologies, the 24 individual voice/data channels comprising a T1 formatted frame that originate at one customer site may terminate at multiple customer sites at the far end. To ensure high channel availability, point-to-multi-point topology uses redundant and diverse T1 network facilities. Protection switch hardware at each end of a protected channel, i.e., a link between two customer sites, monitors both active and alternate routes for channel outages and selects a working route for communication. To understand the nature and usefulness of channel protection switches (also known as DS1/0 protection switches) for such T1 redundant links, a review of the operation of point-to-multi-point T1 networks is warranted.

With modern telecommunications networks, a customer such as a business customer may select from an array of communication services aimed at providing cost-effective connections to geographically-dispersed sites each having independent data sources. The various available communication systems alternatives range, at one extreme, from ubiquitous direct dialing over the public network to, at the other extreme, specially provisioned private networks. Because of the vagaries of direct dialing, such as call blocking and connect-time cost, a customer with critical communication requirements most often selects a private network. In particular, there has recently been a demand for large private data networks to connect, for example, numerous terminal devices such as reservation terminals to an arrangement of centrally located, fault-tolerant host computers and thereby service consumer transactions. Data networks are generally implemented on private network facilities because computer applications necessitate continuous, on-line connections of terminals to centralized computers.

One common method of implementing a private line network is to connect various customer sites to a T1 network with T1 digital access facilities wherein numerous channels are multiplexed to generate a T1 signal suitable for carriage over these facilities. A channel may have more than one DS0 (i.e. N×DS0, where $1 \leq N \leq 24$). A DS0 is a single 64 kbs signal embedded in the T1 transmission. In reference to point-to-multi-point network topologies, each channel embedded in the T1 transmission will hereinafter be referred to as a fractional T1 channel. Each fractional T1 channel transfers one or more DS0's between two customer sites. At a near end, a number of fractional T1 channels from one or more sites are multiplexed to form a T1 signal. At a destination end (far end), the high-rate T1 signals are demultiplexed to recover the fractional T1 channels. Oftentimes, fractional T1 channels are provided by a common carrier over carrier-owned T1 facilities on a long-term or semi-permanent basis. T1 facilities are provisioned by the common carrier through static cross-connect switches generally referred to as a Digital Access and Cross Connect System (DACCS). Unlike telephone-carrier switches which handle telephone call setups, a DACCS establishes routes which may remain connected for years.

Efficient use of T1 facilities requires individual routing of fractional T1 channel. Therefore, fractional T1 channels within the T1 signal which are terminated at a particular customer site, may not all be derived from the same customer site at the far end. Typically, facility failures in such private networks require restoration efforts that are correspondingly sophisticated and time-consuming. Accordingly, facility engineers have sought techniques to provide for efficient and automated restoration of facilities when deleterious service conditions are detected.

Recently, a service has been introduced by one interexchange carrier which provides switched digital data service at fractional T1 speeds. In using the service, a customer is able to establish a back-up dial-up link to restore a failed fractional T1 channel. However, such a service has the disadvantage of blocking, that is, a link between the end points is not always available. Moreover, it takes at least a few seconds to establish a connection over such a link each time a dial-up is attempted. A significant loss of data can occur within a few seconds.

To improve channel restoration capabilities in T1 communications networks, a protection switch as disclosed in United States patent application entitled "Automatic Restoration of Fractional DS1 Channels Carried Over DS1 Digital Links", filed Dec. 9, 1991 and accorded Ser. No. 07/805,340, which is incorporated by reference herein and assigned to the present assignee, has been developed. This arrangement, known as a DS1/0 protection switch, hereinafter DS1/0 PS, uses an active and a back-up communication path to propagate redundant, fractional T1 channels.

Generally speaking, to implement the channel restoration apparatus, a pair of DS1/0 PS are situated at near and far ends of a protected fractional T1 channel. A protected fractional T1 channel is comprised of two fractional T1 routes, one active and one inactive (alternate), both of which propagate identical data. Each DS1/0 PS includes: (1) detection circuitry to detect the presence of a DS0 fault indication signal, such as a digital access cross-connect system (DACCS)-generated trouble code, in any of the DS0's of the fractional T1 channel arriving over either an active or an alternate network; and (2) switching circuitry to transfer the corresponding fractional T1 channels having the trouble code in at least one of its DS0's from the active route to the alternate route. The use of paired devices spanning both ends of the fractional T1 channel ensures that both directions of propagation are protected from fault conditions that could arise within either network and adversely affect transmission in either direction over either one of the networks. In addition, each DS1/0 PS also includes circuitry to transmit two identical versions of data, generated by terminal equipment, which then are transmitted to the far-end over both the active and alternate routes. Each DS1/0 PS operates by detecting a so-called DACCS "trouble code" which is inserted by a DACCS on all outgoing DS0's at the occurrence of a T1 facility failure. Subsequently, based upon the presence of this code, the DS1/0 PS automatically switches a fractional T1 channel from an active route to a corresponding fractional T1 channel in the alternate fractional T1 route provided by the alternate network in order to restore service.

Both the ECS and DS1/0 PS are produced as dedicated, single-purpose hardware. Typically, each switch operates in conjunction with individual support circuitry and software. To reduce costs, it would be desirable to combine both types of protection switches into a single hardware unit. Moreover, utilization of two separate switches having separate chassis and support circuitry, disadvantageously requires a significant amount of space within customer premises. As such, a need currently exists in the art for a combination protection switch that operates in: (a) one mode for protecting point-to-point T1 links while at the same time utilizing a protection T1 link to correct errors in an active T1 link; (b) and another mode for protecting fractional T1 channels.

SUMMARY OF THE INVENTION

In accordance with a broad aspect of my present invention, a combination protection switch having both transmitter and receiver circuits that are customer controlled to operate as either ECS or DS1/0 PS hardware is provided. To provide both ECS and DS1/0 PS functionality, my innovative receiver circuit uses a time-slot interchange process to buffer data received from two redundant T1 networks and select data therefrom.

Specifically, the transmitter circuit duplicates an input T1 formatted bit stream into two such formatted streams and transmits the two resulting bit streams onto redundant, private line T1 networks, i.e., a primary network and a secondary (back-up) network. The transmitter circuitry is compatible with both point-to-point network topologies and point-to-multi-point network topologies. Additionally, the input data stream can be in either D4 or ESF framing format.

Additionally, receiver circuitry is provided that operates in either the DS1/0 PS or ECS mode. Accordingly, if redundant point-to-multi-point fractional T1 channels are used, the customer selects the DS1/0 PS mode. Alternatively, if redundant, point-to-point T1 services are used, the customer selects the ECS mode.

Specifically, the receiver is comprised of alignment circuitry and route selection circuitry connected in series. In the DS1/0 PS mode, the alignment circuitry aligns each received T1 signal, from each network, relative to one another on a superframe basis. In contrast, in the ECS mode, the received signals are aligned on a bit level to remove any differential delay caused by differences in the length of each respective route.

In the DS1/0 PS mode, the route selection circuitry operates by sequentially storing each of the 24 DS0's from each route in respective time-slot interchange (TSI) buffers. Each TSI buffer is sufficiently large to store one T1 frame from each route. The route selection circuitry monitors the DS0's from both networks as they are stored to detect any DACCS trouble codes. Following T1 storage, the DS0's are subsequently read from the buffers using a time-slot interchange technique to recreate a T1 frame for further processing by T1 terminal equipment connected to the output of the receiver. If the receiver detects a trouble code in a specific DS0, that DS0 is replaced with a DS0 from the TSI buffer connected to the secondary network. Consequently, an output T1 frame contains only DS0's without DACCS trouble codes.

Alternatively, the route selection circuitry operates in an ECS mode, wherein, after alignment, the circuitry receives a first ESF superframe from each of the primary and secondary networks and stores the first ESF superframe in the same primary and secondary TSI buffers as used to store DS0's when the route selection circuitry operates in the DS1/0 PS mode. Also, the route selection circuitry stores two second ESF superframes, one from each network, in two ESF superframe buffers. The second ESF superframes follow the first ESF superframes in time. The ESF superframe buffers are each connected to the primary and secondary networks, respectively, via the alignment circuitry. A CRC detector computes a CRC-6 code from information bits in the first ESF superframe and compares the computed code to a CRC-6 check sub-sequence contained in the second ESF superframe. This computation and comparison is separately accomplished for the ESF superframes received from both the primary and secondary networks. If the CRC-6 code and CRC-6 check sub-sequence do not match, the route selection circuitry deems the first ESF superframe to contain a logical error. If the first ESF superframe received from the primary network does not contain a logical error while the first ESF superframe received from the secondary network contains a logical error, the ESF superframe stored in the primary TSI buffer is read-out and produced as an output of the receiver. Alternatively, if the first ESF superframe from the primary network contains a logical error, while the first ESF superframe from the secondary network does not contain a logical error, the ESF superframe stored in the secondary TSI buffer is read-out. However, if the first ESF superframe received from both the primary and secondary networks are erroneous or both are correct, the receiver selects an ESF superframe from the TSI buffer connected to the network with a lower historical error rate. By first aligning the ESF superframe and then selecting as an output an ESF superframe which is errorless, or substantially errorless, the receiver performs a "hitless" error correction.

BRIEF DESCRIPTION OF THE DRAWINGS

The organization and operation of this invention can be clearly understood from considering the following detailed description in conjunction with the accompanying drawings in which:

FIG. 8 depicts a proper arrangement of the drawing sheets for FIGS. 8A and 8B, the latter two figures collectively depicting a high-level block diagram of receiver 899, in accordance with the present invention;

FIG. 8A is a high-level block diagram of alignment circuitry 900, within receiver 899, for aligning signals received from a primary and a secondary network;

To facilitate understanding, identical reference numerals have been used, where possible, to denote identical elements that are common to various figures.

DETAILED DESCRIPTION

To place in perspective the detailed description of the present invention and thereby highlight the departure from the art as disclosed and claimed herein, it is both instructive and informative to first gain a basic understanding of the telecommunications environment in which the present invention operates. Hence, I will initially present certain foundational principles concerning conventional T1 service and conventional protection switch technology associated with that service. This approach has the advantage of introducing notation and terminology which will aid in elucidating the various detailed aspects of the present invention. Thereafter, I will specifically describe circuitry aspects of the present invention as well as the concomitant methodology.

I. A TYPICAL NETWORK ARRANGEMENT

Figure 1:
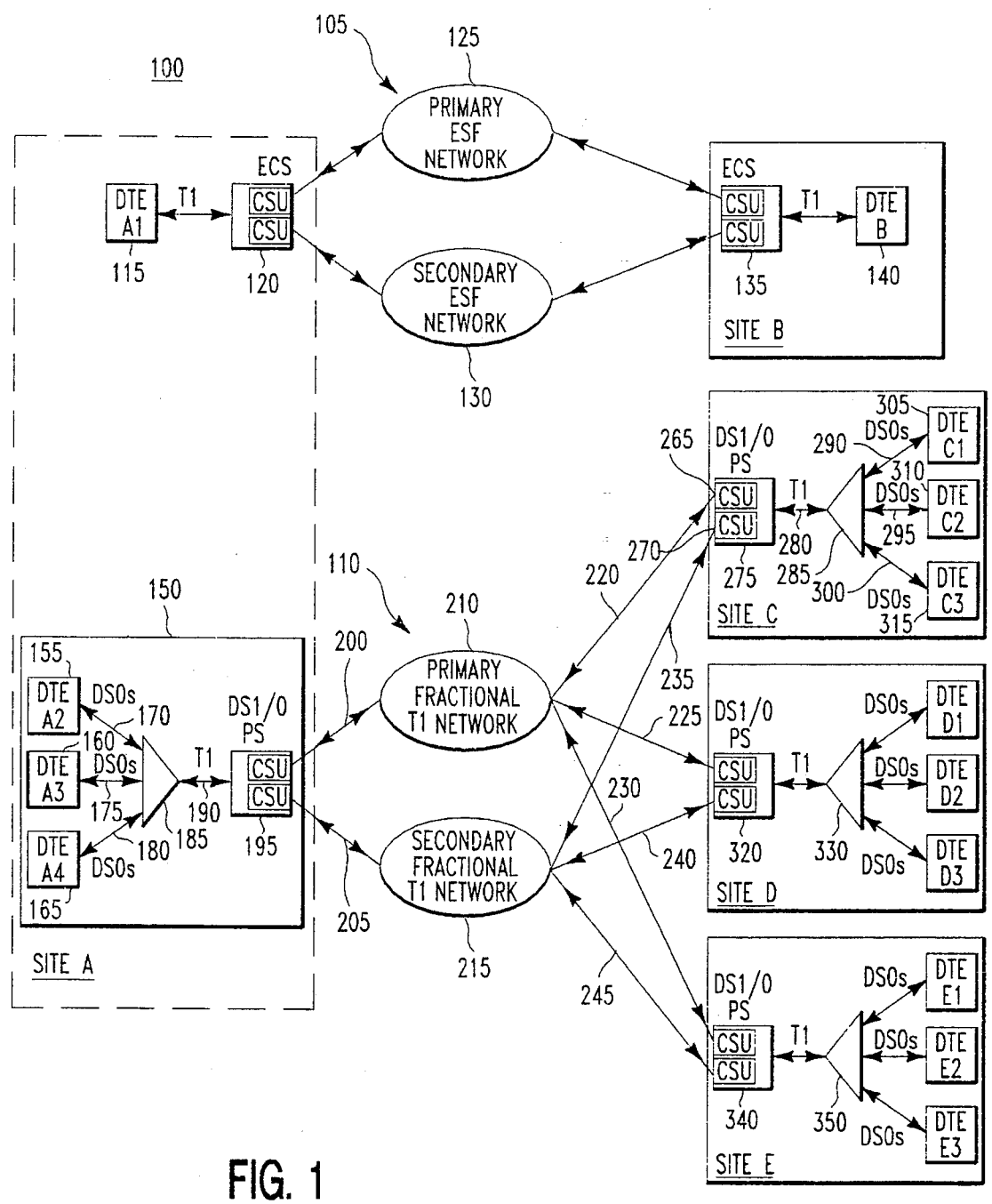
FIG. 1 illustrates, in high-level block diagram form, network systems 105 and 110 that provide T1 service between two customer sites (A and B) and fractional T1 service among a variety of customer sites (A, C, D, and E)

FIG. 1 depicts, in high-level block diagram form, redundant ESF formatted T1 networks 105 and redundant T1 networks 110 which form collectively telecommunications system 100 connecting multiple, geographically disperse customer premises (sites A–E). Specifically, private networks 105 comprising primary and secondary ESF formatted T1 networks 125 and 130 connect site A to site B, i.e., in a point-to-point topology. Additionally, primary and secondary T1 networks 210 and 215 connect site A to site C, site D, and site E, i.e., in a point-to-multi-point topology. Each network connection will be explained, first, at a high-level and then in detail below.

To enhance channel availability and provide improved error performance along point-to-point network 105 between digital terminal equipment (DTE) A1 115 at site A and DTE B 140 at site B, system 100 employs error correction switches (ECS) 120 and 135 as interfaces to primary and secondary, i.e., redundant, extended superframe format (ESF) T1 networks 125 and 130. At the transmit end, for instance site A, ECS 120 generates two copies of T1 formatted data provided by DTE A1 115. The framing format used is ESF. ECS 120 then transmits the copies to the far end, for instance site B, over separate ESF formatted T1 networks 125 and 130. At the far end, ECS 135 evaluates both incoming T1 signals received from the redundant T1 paths. To check both signals for errors, ECS 135 uses the CRC-6 error detection code that is inherent in the ESF framing format. Of the two ESF superframes received from the two separate networks, after error evaluation, ECS 135 forwards an ESF superframe without errors through to DTE B 140. Assuming that error statistics are independent for the two T1 transmission paths, a CRC-6 based error correction method should correct almost all network generated errors.

ECS 120 and DTE A1 115 located at site A function in the same manner as ECS 135 and DTE B 140 located at site B. Therefore, communications from site B to site A is error corrected in the same manner as described above.

As is well-known in the art, error performance is typically measured by the percentage of error-free seconds during a 24 hour period. This performance measure is known as the error-free-second performance. Given a 96.5% error-free-second performance for each T1 transmission path, utilization of an ECS at each customer premise provides a minimum 99.9% error-free-second performance.

As is typical in many communication system applications, in addition to a point-to-point network topology, primary and secondary T1 networks 210 and 215 connect site A to various other sites to communicate T1 formatted data on a fractional T1 channel basis. Each customer premise contains a network interface system comprising DS1/0 Protection Switches (DS1/0 PS) 195, 275, 320 and 340. Each DS1/0 PS selects data from either primary T1 network 210 or secondary T1 network 215 depending upon the historic and current DACCS "trouble code" status in each fractional T1 channel within the primary and secondary T1 networks.

Specifically, site C contains three DTEs 305, 310 and 315 each of which generates individual digital signals. Similarly, sites A, D and E contain multiple DTEs. Using site C as an example, channel bank 285 multiplexes each DTE signal with other DTE signals on lines 290, 295 and 300 to form a T1 formatted transmission, on line 280, having three fractional T1 channels. A transmitter (not shown) within DS1/0 PS 275 generates two identical copies of the T1 transmission on line 280 and, then transmits, via lines 220 and 235, the T1 transmission to primary and secondary T1 networks 210 and 215. Built-in channel service units (CSU) 265 and 270 connect the transmitted T1 signals to the primary and secondary networks. The CSUs are well-known devices that form an interface between the public networks and the end user to mitigate such disturbances as, for example, lightning transients and end-user equipment power outages.

As the customer data propagate through each fractional T1 channel within the primary and secondary networks, network DACCS inserts a "trouble code" into individual DS0's whenever a failed network facility is detected. Upon reception of the T1 signal at site A, DS1/0 PS 195 constructs a new T1 signal on line 190 by first examining each individual DS0 within the T1 signals received from the primary and secondary T1 networks. Thereafter, this switch selects DS0's for the new T1 signal based upon whether a "trouble code" is present in any of the received DS0's comprising the received fractional T1 channel. If a trouble code is detected in a DS0 associated with a fractional T1 channel, a switchover occurs for all of the DS0's within that fractional T1 channel. In this manner, the switch avoids potential synchronization errors that would arise if the individual DS0's comprising a single fractional T1 channel were routed through two networks each having a different propagation delay. DS1/0 PS 195 then sends the new T1 signal to channel bank 185 to demultiplex fractional T1 channels and forward, via lines 170, 175 and 180, each fractional T1 channel to appropriate destination DTEs 155, 160 and 165, respectively.

Each customer site connected to the primary and secondary T1 networks 210 and 215 accomplishes the foregoing process of creating T1 signals using DS0's from properly operating fractional T1 channels. In a similar manner to that described above with respect to communications between sites A and C, the depicted arrangement supports communication amongst any of the connected sites, i.e., communication between sites A and D, A and E, C and D, and so on. In essence, this arrangement creates a redundant system which automatically restores fractional T1 channels when one or more of those channels is lost due to a network connection failure. Therefore, Using the DS1/0 PS, as summarized above, achieves enhanced availability of fractional T1 channels on the order of 99.999% availability over a 12 month period.

II. DETAILED DESCRIPTION OF AN ERROR CORRECTION SWITCH

Figure 2:
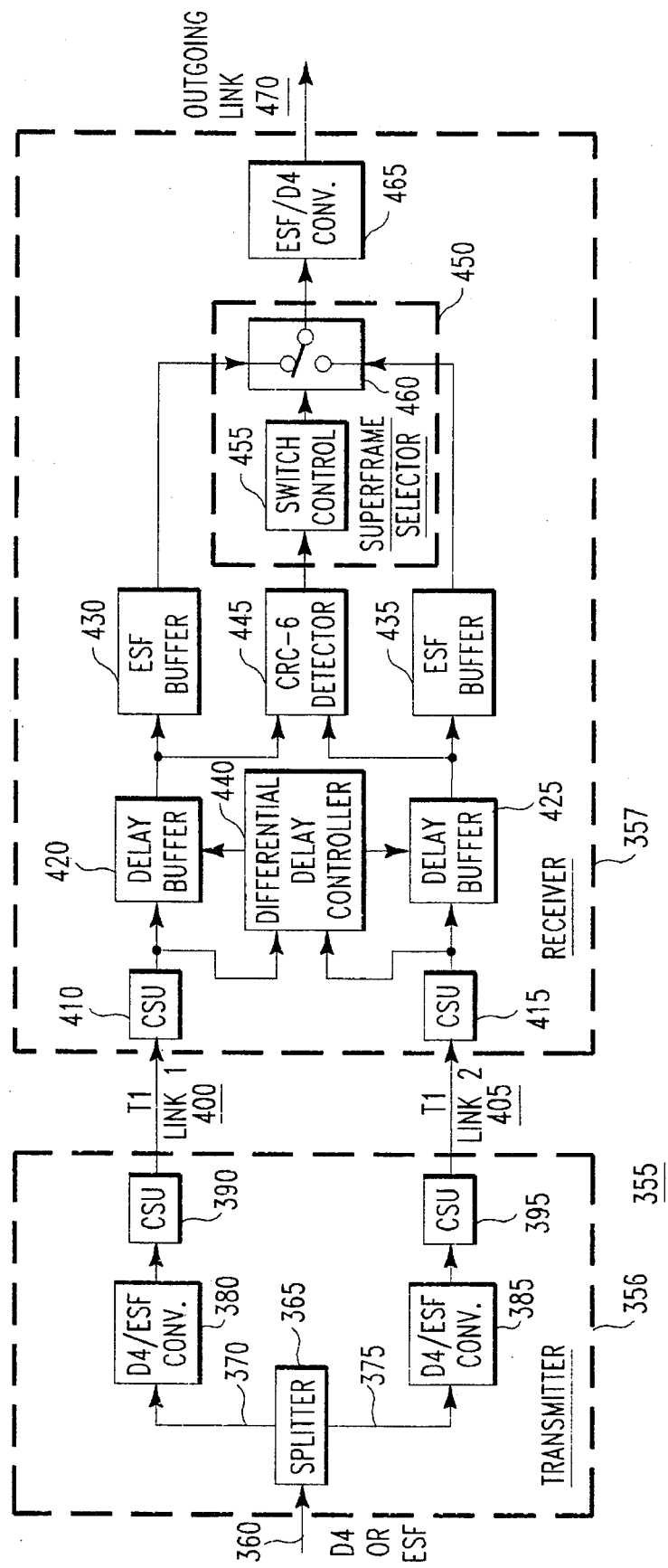
FIG. 2 is a high-level block diagram of one illustrative transmitter-receiver pair 355 forming an Error Correction Switch (ECS) for a system having route diversity.

FIG. 2 shows a high-level block diagram depicting one direction of operation of transmitter-receiver pair 355, namely, ECS transmitter 356 and ECS receiver 357. Transmitter-receiver pair 355 represents the interaction of two ECSs. For example, this pair represents the transmitter of ECS 120 and receiver of ECS 135 depicted in FIG. 1. The incoming digital stream shown in FIG. 2, on link 360, from the digital transmission equipment (not shown) to ECS transmitter 356 may be in either a D4 or ESF format. Illustratively, the incoming stream is a T1 signal having a D4 frame format (such as transmitted by DTE A1 115 in FIG. 1). Link 360 delivers this stream to splitter 365 in transmitter 356. Splitter 365 replicates the D4 stream to produce two separate streams in D4 format. Links 370 and 375 route each replicated stream to D4/ESF converters 380 and 385, respectively. D4/ESF converter 380 converts the D4 formatted T1 signal on link 370 into ESF format and sends the T1 signal to CSU 390. CSU 390 then propagates the derived ESF T1 stream over ESF T1 link 1, that is, link 400. Similarly, D4/ESF converter 385 independently converts the D4 formatted T1 signal on link 375 into the ESF format and sends it to CSU 395. CSU 395 then propagates the derived ESF T1 stream over ESF T1 link 2, that is, link 405. If the incoming digital stream on link 360 is already in ESF format, D4/ESF converters 380 and 385 are disabled.

ECS receiver 357 is an illustrative error correction switch receiver that accounts for the practical, but deleterious, effects of unequal transmission delays on link 1 as compared to link 2. The ESF bit stream arriving on link 1 serves as the input to CSU 410. The signal from CSU 410 enters both differential delay controller 440 and delay buffer 420. Similarly, the ESF bit stream arriving on link 2 serves as the input to CSU 415. The signal from CSU 415 enters both differential delay controller 440 and delay buffer 425. Differential delay controller 440 derives ESF superframe synchronization information for the two ESF bit streams on links 1 and 2. Circuitry for accomplishing the synchronization is well-known in the art. Because the data stream on the link with the shorter electrical path arrives first, there is a need to align the duplicated data streams before the streams can be compared to detect logic errors therein. Differential delay controller 440 uses both information and framing bits in the ESF superframe to determine the amount of delay to be inserted into the shorter electrical path for compensation. For instance, if link 1 is the shorter electrical path, then delay buffer 420 is enabled to provide the requisite delay under control of differential delay controller 440. Under these conditions, delay buffer 425 is essentially by-passed. On the other hand, if link 2 is the shorter electrical path, buffer 420 is by-passed and buffer 425 is enabled with appropriate delay under control of controller 440. Then, CRC-6 detector 445 independently calculates the CRC-6 code of each ESF superframe received on link 400 and link 405 to determine whether or not there are logical errors in the ESF superframes. In turn, detector 445 provides control information to ESF superframe selector 450. Normally, selector 450 is set to receive ESF superframes from an incoming link designated the "active" link. For example, if link 400 is designated the active link, then link 405 is the standby link.

For both the active link and the standby link, receiver 357 uses buffers to compensate for differential propagation delay and to store ESF superframes to accomplish error correction. In this regard, the ESF superframes from both the active and standby links must pass through interposed delay buffer 420 and ESF buffer 430, and delay buffer 425 and ESF buffer 435, respectively. Each ESF buffer stores: (1) the ESF superframe (called the "first" ESF superframe for reference purposes) for which the latest CRC-6 code have been computed by CRC-6 detector 445, and (2) the next ESF superframe (called the "second" ESF superframe for reference purposes) which is propagating the CRC-6 check sub-sequence for comparison to the first ESF superframe CRC-6 code previously computed. If no logic errors are detected in link 400 and logic errors are detected in link 405, then selector 450 remains in its present state, that is, ESF superframes from ESF buffer 430 are delivered to ESF/D4 converter 465. The ESF/D4 converter converts the data that is in the ESF framing format to D4 format for handling by a DTE at the customer premise. If the DTE is provisioned to handle ESF formatted signals, ESF/D4 converter 465 is disabled. The properly formatted data exits receiver 357 on outgoing link 470.

Typically, ESF superframe selector 450 comprises switch control circuit 455 and switch 460. As such, CRC-6 detector 445 supplies switch control circuitry 455 with an appropriate signal such that the switch control circuitry positions switch 460 to either select the ESF superframe from ESF buffer 430 or from ESF buffer 435 depending upon the output of CRC-6 detector 445.

If, however, detector 445 detects logic errors in an ESF superframe on link 400, i.e., the active link, i.e., detection of a CRC-6 check sub-sequence in the "second" ESF superframe that does not match the calculated CRC-6 code in the "first" ESF superframe, and no error is detected in the same ESF superframe on link 405, i.e., the standby link, selector 450 switches from the active link to the standby link (opposite to that shown), thereby delivering an ESF superframe from ESF buffer 435 to ESF/D4 converter 465. Consequently, because ESF superframes are temporarily stored during CRC calculations, the error detection and error correction occurs before erroneous ESF superframes reach the end user. Unless errors are detected in both superframes, i.e., one received on link 400 and one received on link 405, only uncorrupted ESF superframes reach the end user because of the switching action of selector 450. This protection switch arrangement thereby provides T1 service with improved error performance to such end users. In addition to providing T1 service with improved error performance, the ECS utilizes signal buffering and propagation delay equalization as described above, to provide "hitless" service restoration. Accordingly, receiver 357 delivers to the data transmission equipment a T1 signal without any data loss due to either link 400 or link 405 failure. Moreover, although only one direction of propagation (i.e., left-to-right) has been discussed in detail, it is readily apparent that a bidirectional system may be realized by essentially replicating the components of FIG. 2 for the other direction (i.e., right-to-left).

If links 400 and 405 are diversely routed, then error events are generally uncorrelated and the probability of simultaneous error conditions is insignificant. Nonetheless, in the unusual situation where both links have errors, then selector 450 selects the link which has had the better recent error performance. Similarly, when both links are errorless, the link with the better recent error performance is selected as the active link.

III. DETAILED DESCRIPTION OF A DS1/0 PROTECTION SWITCH

With reference to network 110 shown in FIG. 1, the network facilities exemplified by links 200, 205, 220, 225, 230, 235, 240 and 245 are T1 links which serve as access links to interconnect geographically-dispersed customers sites (referred to as sites A, C, D, and E, respectively) to primary and secondary T1 networks 210 and 215. These sites contain DS1/0 PS 195, 275, 320 and 340 to interface corresponding channel banks 185, 285, 330 and 350, via the access links, to each of the redundant T1 networks, i.e., primary and secondary T1 networks 210 and 215. To place in perspective the details of a DS1/0 PS, review of the operation of fractional T1 channels in a typical T1 network, is both instructive and informative.

Figure 3:
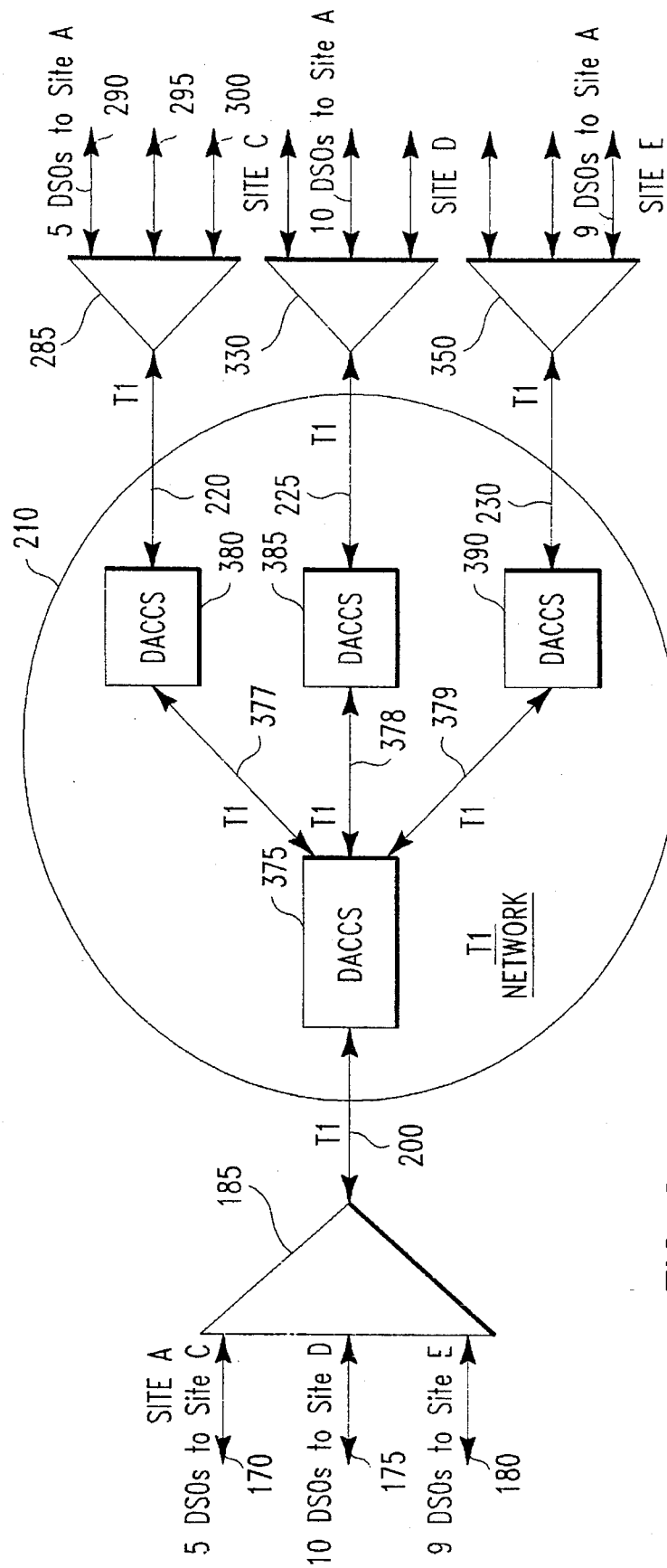
FIG. 3 illustrates a network facility wherein a number of customer sites A, C, D and E are interconnected by digital access cross-connects systems (DACCSs) 375, 380, 385 and 390 coupled by T1 facilities 200, 377, 378, 379, 220, 225 and 230.

FIG. 3 is a block diagram of an exemplary T1 network, for example, primary T1 network 210 of FIG. 1. The various T1 links depicted in FIG. 3 are bidirectional; each connected to a different set of terminating equipment. For instance, link 200 is connected to digital channel bank 185 as one termination and digital access cross-connect system (DACCS) 375 as a second termination; links 220, 225 and 230 are terminated similarly. To simplify the following review of T1 networks, each DS1/0 PS shown in FIG. 1 is presently ignored and not depicted in FIG. 3. Broadly speaking, each DACCS shown in FIG. 3 is a semi-permanent switch which provides DS0 level routing in the T1 network. The DACCS redistributes twenty-four individual DS0's in the T1 link terminated at the DACCS among multiple outgoing T1 links that are routed to various destinations. DACCS pair 375 and 380 terminate link 377; DACCS pairs 375 and 385, and 375 and 390, terminate links 378 and 379, respectively. DACCS 375 also terminates one end of T1 link 200, while DACCS 380, 385 and 390 also terminate one end of respective T1 links 220, 225 and 230.

Each digital channel bank, of which four (banks 185, 285, 330 and 350) are specifically shown, multiplexes up to twenty-four lower-level fractional T1 channels from each specific DTE to a T1 link in the following manner. By way of example, channel bank 185 at site A is considered as representative: (i) with site A as a source, DTEs (not shown) at this site originate up to twenty-four fractional T1 channels which are multiplexed by channel bank 185 into a composite signal suitable for propagation over T1 link 200; (ii) with the DTEs at site A as a destination, the same channel bank 185 demultiplexes the incoming T1 signal on link 200 to produce up to twenty-four independent fractional T1 channels. Thus, channel bank 185 is bidirectional, having incoming ports connected to site A for data originating at site A, and an outgoing port connected to T1 link 200, whereas for data terminating at site A, an incoming port of channel bank 185 is connected to T1 link 200 and outgoing ports are connected to the DTEs at site A.

In a similar manner, each T1 link has incoming and outgoing ends which are defined by the direction of signal propagation on the T1 link. For example, the incoming and outgoing ends of link 200 connect to channel bank 185 and DACCS 375 for signals originating at site A. Accordingly, each link, channel bank, and DACCS supports full-duplex transmission. In one implementation of a T1 link, the communication medium is paired wire cable; a T1 link utilizes two wire-pairs to support the bidirectional propagation—one pair for each direction.

In modern private T1 networks, not all 24 DS0's which originate at a near-end location, for instance, site A, terminate at the same location at the far end, for instance, site C. This is exemplified in FIG. 3 wherein, at site A, illustratively five DS0's are destined for site C, ten DS0's for site D, with the remaining nine DS0's have site E as their destination. Interposed DACCS 375, 380, 385 and 390 accomplish the signal routing. For DS0's originating at site A, the incoming port of DACCS 375 receives the full complement of twenty-four DS0's over link 200 and partitions this T1 transmission into groups of five, ten, and nine DS0's for distribution over links 377, 378 and 379, respectively. At the far end of link 377, the five DS0's destined for site C are switched through DACCS 380 and then propagated over link 220 and, after demultiplexing by channel bank 285, at site C, these five DS0's terminate at a DTE at site C. Similarly, at the far end of link 378, the ten DS0's destined for site D are switched through DACCS 385 and then propagated over T1 link 225 and, after demultiplexing by channel bank 330 at site D, these 10 DS0's terminate at a DTE at site D. Finally, at the far end of link 379, the nine DS0's destined for site E are switched through DACCS 390 and then propagated over link 230 and, after demultiplexing by channel bank 350 at site E, these 9 DS0's terminate at a DTE at site E.

Because of the interconnection arrangement of network 210, a single, isolated failure in this T1 network may affect only a fraction of the DS0's at a given customer site. For example, a break in T1 link 220 between DACCS 380 and site C affects only five DS0's received at site A. In order to report a facility failure downstream, each DACCS 375, 380, 385 and 390 is implemented to insert a so-called DACCS "trouble code" in all outgoing DS0's which are cross-connected to T1 ports that detect a facility failure. In this regard, reference is made to the Technical Reference TR-TSY-000170, Issue 1, "Digital Cross-Connect Requirements and Objectives", Bell Communications Research (Bellcore) November 1985; this document being incorporated by reference herein. This DACCS "trouble code" is a predefined eight bit pattern. The user can select one of the two standard trouble codes, namely, "11100100", or "00011010". Also, the DACCS allows selection of any 8-bit pattern for insertion into the outgoing DS0's during a failure. This "trouble code" generating aspect of each DACCS is explained with reference to FIG. 4.

Figure 4:
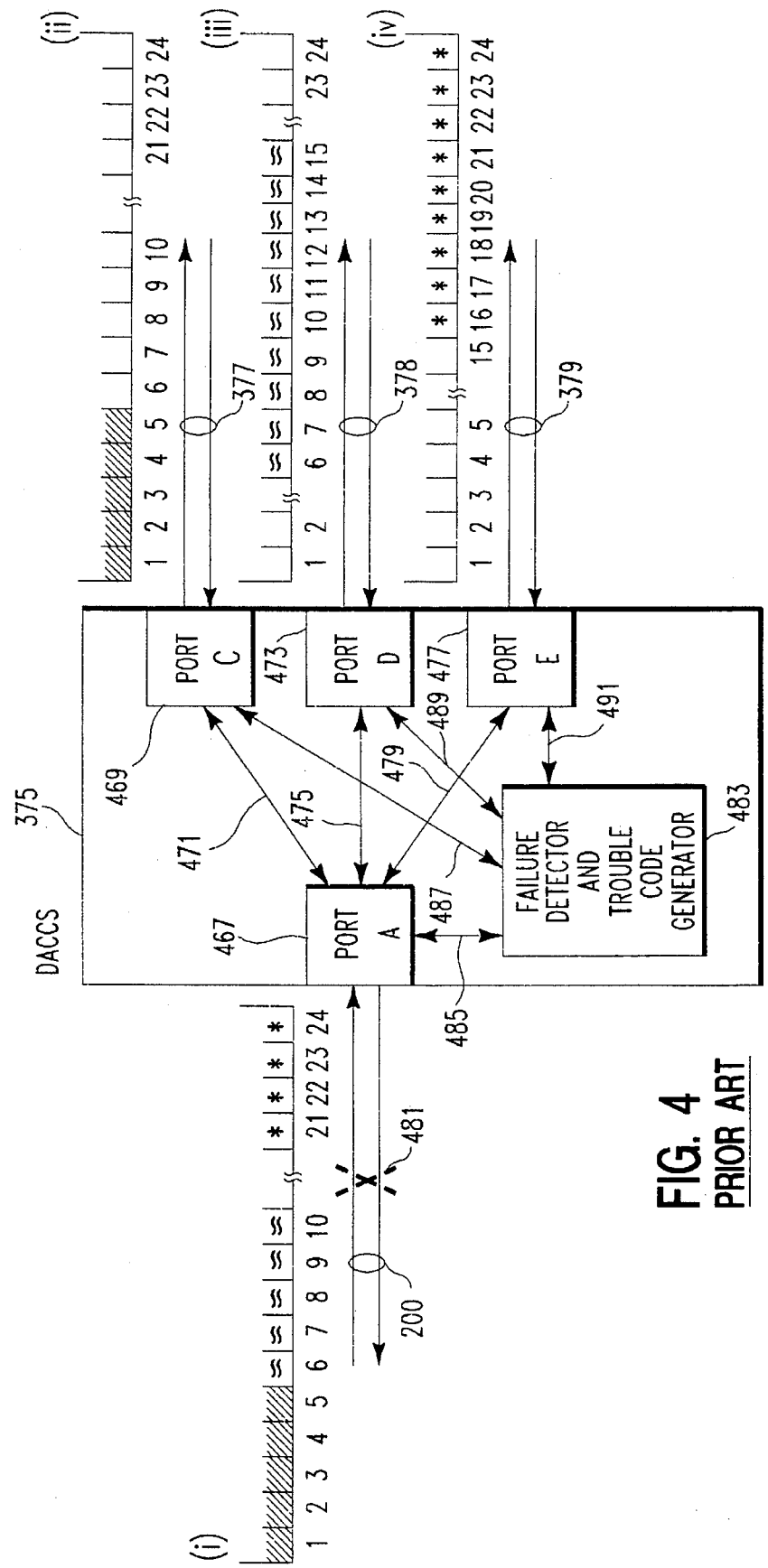
FIG. 4 depicts DACCS 375 which incorporates DACCS "trouble code" generator 483 to insert DACCS "trouble codes" into DS0's composing a T1 signal.

FIG. 4, which focuses on an arrangement, shown in block diagram form, for DACCS 375 depicted in FIG. 3, depicts incoming DS0's, numbered 1 through 24 on line (i), are cross-connected in the following manner: (1) cross-connect bus arrangement 471 routes DS0's 1–5 from port 467 (Port A) to port 469 (Port C), as further depicted on line (ii); (2) cross-connect bus arrangement 475 routes DS0's 6–15 from Port A to port 473 (Port D), as further shown by line (iii); and (3) cross-connect bus arrangement 479 routes DS0's 16–24 from Port A to port 477 (Port E), as further illustrated by line (iv). In addition and as shown in FIG. 4, T1 links 200, 377,378 and 379 connect to Ports A, C, D and E, respectively. The bidirectional nature of each of these links is shown by directional arrows on the two one-way links comprising each single bidirectional link. A full complement of DS0's in each T1 link is not shown for simplicity. It should also be noted that DS0's 1–5 in line (i) do not necessarily have to be placed into DS0's 1–5 in line (ii); they may be placed in any DS0 slots, so what is shown is merely illustrative.

If a failure occurs in T1 link 200, as shown by large dashed "X" 481, then port A senses the loss of signal on the incoming T1 link and, using failure detector and trouble code generator 483, places a "trouble code" in all the outgoing DS0's which are cross-connected to the T1 port detecting the failure, namely, Port A. Leads 485, 487,489 and 491 connect failure detector and trouble code generator 483 to all T1 ports in the DACCS, including Ports A, C, D and E, respectively. Inasmuch as DACCS 375 may have upwards of several hundred T1 ports; ports A, C, D and E are merely illustrative. With this arrangement, outgoing T1 link 377 has DACCS "trouble codes" in DS0's 1–5, as shown cross-hatched on line (ii). Similarly, DS0's 6–15 of link 378 propagate DACCS "trouble codes" as depicted by the "wavy" line symbols () on line (iii). Finally, DS0's 16–24 of T1 link 379 propagate DACCS "trouble codes" as depicted by the "asterisk" symbols () on line (iv). Such DACCS "trouble codes" would also be transmitted if a hardware failure occurred in Port A of DACCS 375 that precluded the DACCS from passing information through Port A. The purpose of the DACCS-generated "trouble code" is to inform downstream terminal equipment, such as channels banks 285, 330 and 350 of FIG. 3, of a failure of a particular DS0. In the above example, upstream equipment, such as channel bank 185 (shown in FIG. 3), senses the loss of signal due to the break in T1 link 200.

Generally, the inserted DACCS trouble codes differ slightly depending upon whether the trouble code is to be inserted into a T1 information frame or a signaling frame. Within a given series of T1 frames, for example, the 24 frames comprising an ESF superframe, five out of every six T1 frames are information frames and the sixth frame is a signaling frame. In the information frames, each DS0 time-slot contains eight information bits; the DACCS "trouble code" is a pre-defined, though user changeable, eight-bit pattern (e.g., the DACCS trouble code is "11100100") with the right-most bit being the least significant bit. In the signaling frames, each DS0 time-slot contains seven information bits and one signaling bit; the same "trouble code" in this case is "1110010X", where "X" indicates a "do not care" state. (The least significant bit is used for signaling.)

Figure 5:
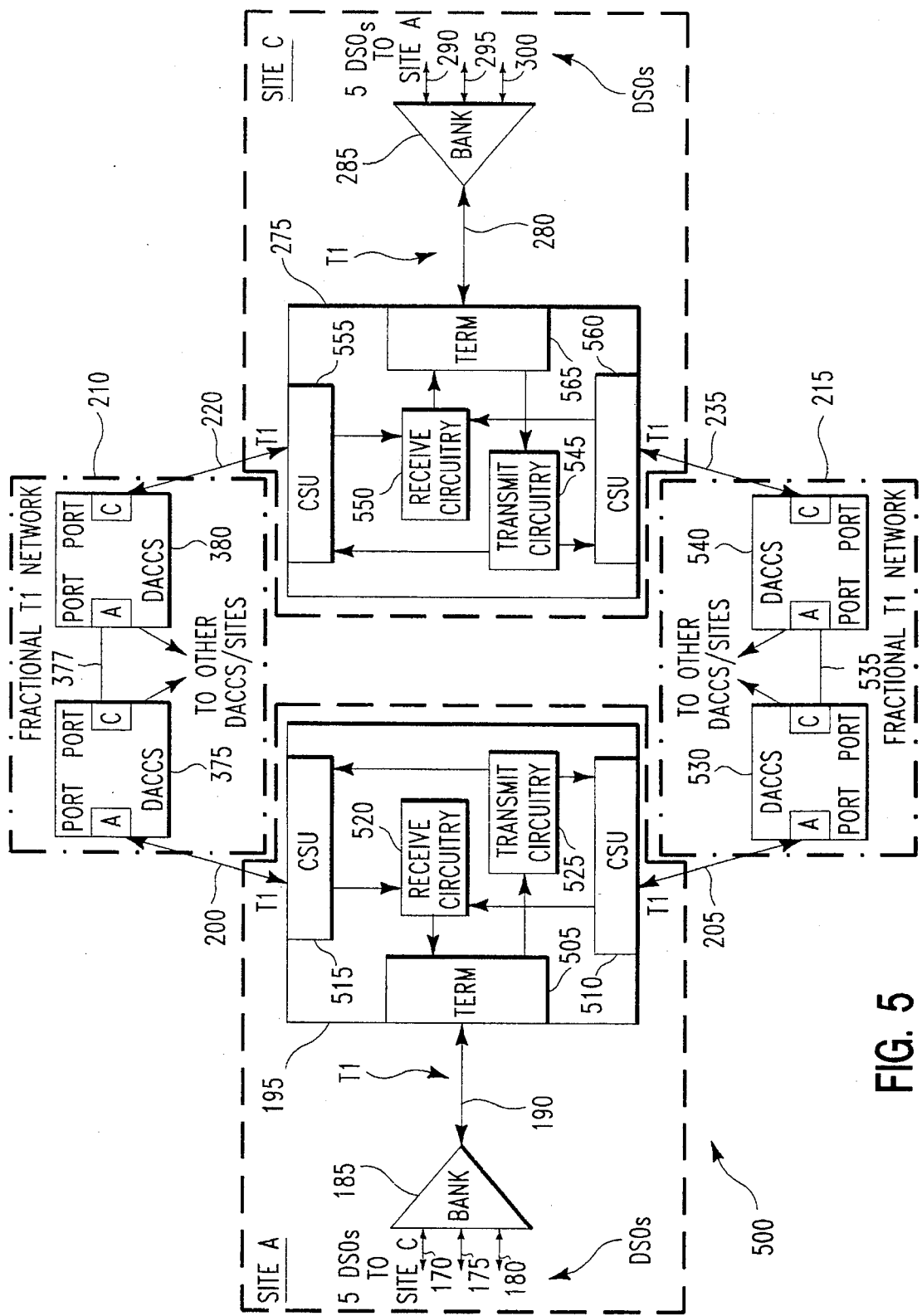
FIG. 5 is a block diagram of a pair of DS1/0 Protection Switches (DS1/0 PS) 195 and 275 operating in conjunction with redundant networks 210 and 215.

As shown in FIG. 5, digital network system 500, is arranged so that two customer sites, illustratively sites A and C, communicate with each other utilizing DS1/0 PS pair 195 and 275, shown in FIG. 1, to protect against loss of communication due to a facility failure condition(s). Digital channel banks 185 and 285, shown in FIG. 5, couple sites A and C, respectively, to network system 500, and consistent with FIG. 3, five DS0's originating at site A are destined for site C and vice versa. Generally, each channel bank and associated protection switch are both customer premises equipment, i.e., both are typically located at the same customer site. For example, channel bank 185 and switch 195 are both co-located at site A, while channel bank 285 and switch 275 are both co-located at site C.

As shown in FIG. 5, interposed T1 line 190 couples switch 195 to channel bank 185; the connection of link 190 to switch 195 occurs on Terminal (TERM) port 505. In turn, switch 195, through CSUs 510 and 515, connects to two independent T1 networks 210 and 215 via T1 links 200 and 205, respectively. Communication networks 210 and 215 provide redundant communication paths for signal propagation between customer sites A and C. Illustratively, network 210 is a primary or active network which is typically supplied by a primary inter-exchange carrier, whereas network 215 is a secondary or back-up network which is supplied by another, independent inter-exchange carrier. Communication network 210 is primary in the sense that it is the network of preference whenever network 500 is initially brought on-line. In this illustrative example, DACCS pair 375 and 380 as well as T1 link 377, interconnecting this DACCS pair, comprises primary network 210. Typically, DACCS 375 and 380 also connect to other DACCS in network 210 and other customer sites (not shown). Similarly, DACCS pair 530 and 540 as well as T1 link 535 interconnecting this DACCS pair comprise secondary network 215. Typically, DACCS 530 and 540 also connect to other DACCSs in network 215 and other customer sites (not shown).

Switch 275, through its CSUs 555 and 560, connects to networks 210 and 215 via interposed T1 links 220 and 235, respectively. TERM port 565 of switch 275 terminates one end of link 280, with the other end of link 280 being connected to channel bank 285.

Switch 195 includes transmit circuitry 525 which receives a T1 signal as an input from corresponding TERM port 505 and generates two identical copies of the T1 signal. In turn, transmit circuitry 525 simultaneously transmits these two copies, via CSUs 510 and 515 of switch 195, over primary and secondary networks 210 and 215. Similarly, switch 275 includes transmit circuitry 545 which receives a T1 signal as an input from associated TERM port 565 and generates two identical copies of the T1 signal generated by channel bank 285; including the five DS0's destined for site A. In turn, transmit circuitry 545 simultaneously transmits these latter two copies, via CSUs 555 and 560 of switch 275, over primary and secondary networks 210 and 215.

To exemplify the restoration operation of switches 195 and 275 in order to preclude outages of channels connecting sites A and C (except for a momentary, transitory restoration interval), a failure in T1 link 377 (located within primary T1 network 210) is considered. Prior to the failure, it is presumed that communication network 210 is active, and network 215 operates in a back-up mode. Thus, the actual propagation path of the DS0's emanating from site A to site C, and vice versa, is over network 210 via the electronic coupling of each TERM port with each associated CSU. Failure of link 377 causes a loss of the T1 signal normally arriving: (i) on Port A of DACCS 380 for propagation in the direction from site A to site C; and (ii) on Port C of DACCS 375 for propagation from site C to site A. Both DACCS 375 and 380 detect the failure of T1 link 377 and, in response, insert a DACCS "trouble code" in each DS0 cross-connected to Port C of DACCS 375 and Port A of DACCS 380 including the DS0's propagating on links 200 and 220. These DS0's with DACCS "trouble codes" arrive at CSU 515 of switch 195 and CSU 555 of switch 275. Switch 195 is arranged with receive circuitry 520 to detect these manifestations of the failure, namely, the DACCS "trouble codes", arriving at corresponding CSU 515 from DACCS 375. If a DACCS "trouble code" is present in any of the DS0's for a predetermined interval, typically 100 milliseconds, receive circuitry 520 first checks the information bits in the corresponding alternative DS0's of the other T1. If these DS0's do not contain the DACCS "trouble code" pattern, the switch initiates a switchover to the alternate path. Thus, in this particular case, receive circuitry 520 responds by selecting the DS0's propagating on secondary network 215 as the active DS0's, that is, switch 195 selects the DS0's from CSU 510 rather than CSU 515. Each switch operates independently of the other. Since the communication link through network 215 is presumably operational, communication between site A and site C is reestablished after the momentary switching transient. Independently, switch 275 is arranged with receive circuitry 550 to detect these DACCS "trouble codes" arriving at corresponding CSU 555 from DACCS 380 and respond in a manner similar to receive circuitry 520.

As alluded to above, before any switchover occurs, each switch 195 or 275, through its respective receive circuitry 520 or 550, ensures that a DACCS "trouble code" is present for 100 milliseconds. If so, then the receive circuitry checks to determine if the information bits in the corresponding DS0's in the back-up network have been free of a DACCS "trouble code" in a pre-selected interval, such as the last 10 milliseconds preceding the end of the 100 millisecond interval. Again, if so, then each switch initiates the switchover of that particular group of DS0's to the back-up network. The DS0's with the DACCS "trouble codes" are declared as having an "unavailable" status. This status is subsequently removed if the DACCS "trouble code" is no longer present for a given time interval, such as 1 second. However, even though the "unavailable" status may be removed, the back-up network now becomes the active network for that particular group of DS0's, whereas the previously active network now becomes the back-up network for that particular group of DS0's. In this example, network 210 was originally active for all the DS0's, but remains as the back-up network for the five DS0 connecting sites A and C even after link 377 is cleared of its fault condition.

As another example of the manner of system restoration, an outage in link 220 is now considered. In this case, switch 195 switches upon receiving the DACCS "trouble code" whereas switch 275 switches all 24 DS0's to secondary network 215 based on the loss of the incoming T1 signal detected at switch 275. Switch 275 does not receive a DACCS "trouble code" since link 220 is disabled.

Figure 6:
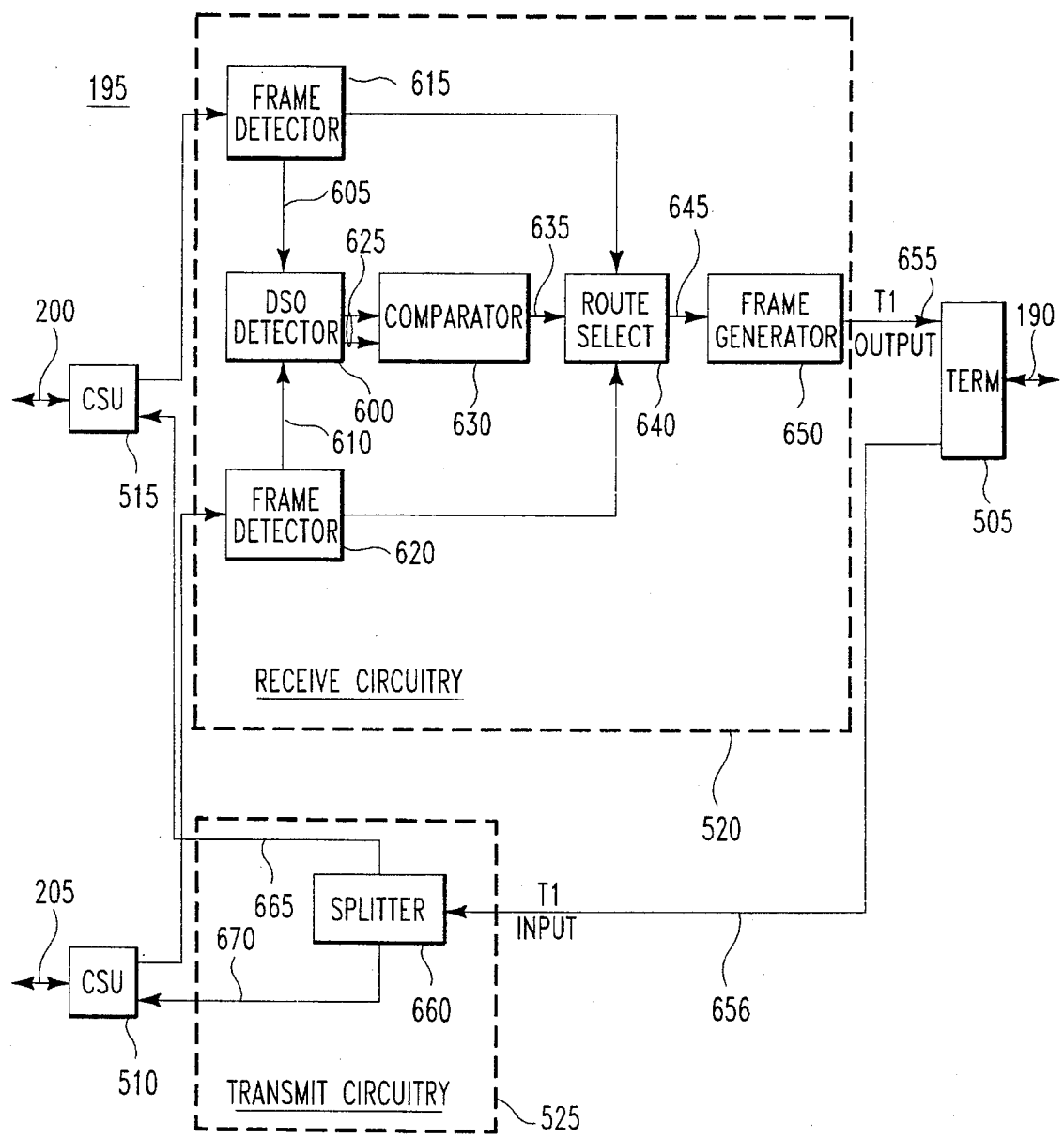
FIG. 6 is a high-level block diagram of illustrative transmit and receive circuitry 520 and 525 of DS1/0 PS 195 shown in FIG. 5.

Continuing with the description of the DS1/0 PS and its operational methodology, the details of a single protection switch, namely, switch 195, are shown in block diagram form in FIG. 6; switch 275 is realized with substantially, if not identically, the same circuitry to effect substantially the same, if not identical, functionality.

In particular and to simplify FIG. 6, only those components that comprise receive and transmit circuitry 520 and 525 and operate to effect the required testing, selecting, and switching, if necessary, and thereby restore digital telecommunications between sites A and C are explicitly shown. The remaining components that are needed to implement circuitry 195 would be readily apparent to anyone skilled in the art. As depicted, CSUs 510 and 515 supply incoming T1 signals from the redundant networks to DS0 detector 600 over lines 605 and 610, respectively. In order to properly recover the fractional T1 channels from each of the incoming T1 signals, appropriate frame detectors 615 and 620 are required. DS0 detector 600 supplies two sequences of DS0's, one derived from the primary network and the other derived from the secondary network, to comparator 630 via leads 625. Comparator 630 compares the DS0 signal in the arriving sequences with the known DACCS "trouble codes". Lead 635 passes the comparison results to route selector 640; the results indicate for the $i^{th}$ DS0, i=1, 2, . . . , 24, which route is to supply the DS0 signal for the given slot. Comparator 630 also includes appropriate circuitry to monitor both the status of each DS0 and each T1 network facility and appropriately change the status of any such DS0 and network facility from being inactive to active, as set forth above. Incoming T1 signals serve as inputs to route selector 640. Selector 640 establishes a sequence which specifies which route has been selected for the twenty-four distinct DS0's and then emits the sequence onto lead 645. Each bit in the sequence indicates from which network a DS0 should be selected. Frame generator 650 then juxtaposes these distinct DS0's to form each T1 frame. The output of frame generator 650, appearing on lead 655, forms the outgoing portion of T1 link 190. TERM port 505 serves as a hybrid to convert the unidirectional signals on lines 655 and 656 into a bidirectional signal on link 190.

Transmit circuitry 525 operates in essentially the same manner as the transmitter in the error correction switch shown in FIG. 2. As shown in FIG. 6, transmit circuitry 525 includes splitter 660 which receives a T1 formatted data stream on line 656 and generates a pair of duplicate T1 data streams on lines 665 and 670, respectively. Each T1 signal is transmitted to the primary and secondary networks via CSUs 510 and 515, respectively.

IV. SPECIFICS OF THE PRESENT INVENTION

In accordance with the present invention, the ECS and DS1/0 PS functions are advantageously combined into a single hardware arrangement. The arrangement comprises a transmitter and a receiver. Generally, the transmitter duplicates an input T1 formatted signal and places the duplicate signals on redundant networks. The receiver receives T1 formatted signals from two redundant networks, aligns the received signals, evaluates the received signals, and selects one of the two received signals for output depending upon the outcome of the evaluation. The form of the evaluation depends upon whether the invention is operating in an ECS mode or in a DS1/0 PS mode. In the ECS mode, the invention functions as the ECS (in FIG. 2) previously described. Similarly, in the DS1/0 PS mode, the invention functions as the DS1/0 PS (in FIG. 6) previously described. The mode of operation is dynamically user selectable. Alternatively, the mode of operation of the invention can be hard wired such that the inventive hardware is identically substitutable for the hardware currently used as an ECS or DS1/0 PS.

Next, the arrangement of the transmitter is discussed in detail. Following the transmitter discussion is a detailed discussion of the receiver.

A. Transmitter Arrangement

As discussed previously, in conventional protection switch arrangements, both the ECS and DS1/0 PS generate two identical copies of an incoming data stream and send one such copy to each respective network via primary and secondary T1 facilities. In addition, both switches have built-in CSUs as their network interfaces and a terminal port as their customer equipment interface.

Figure 7:
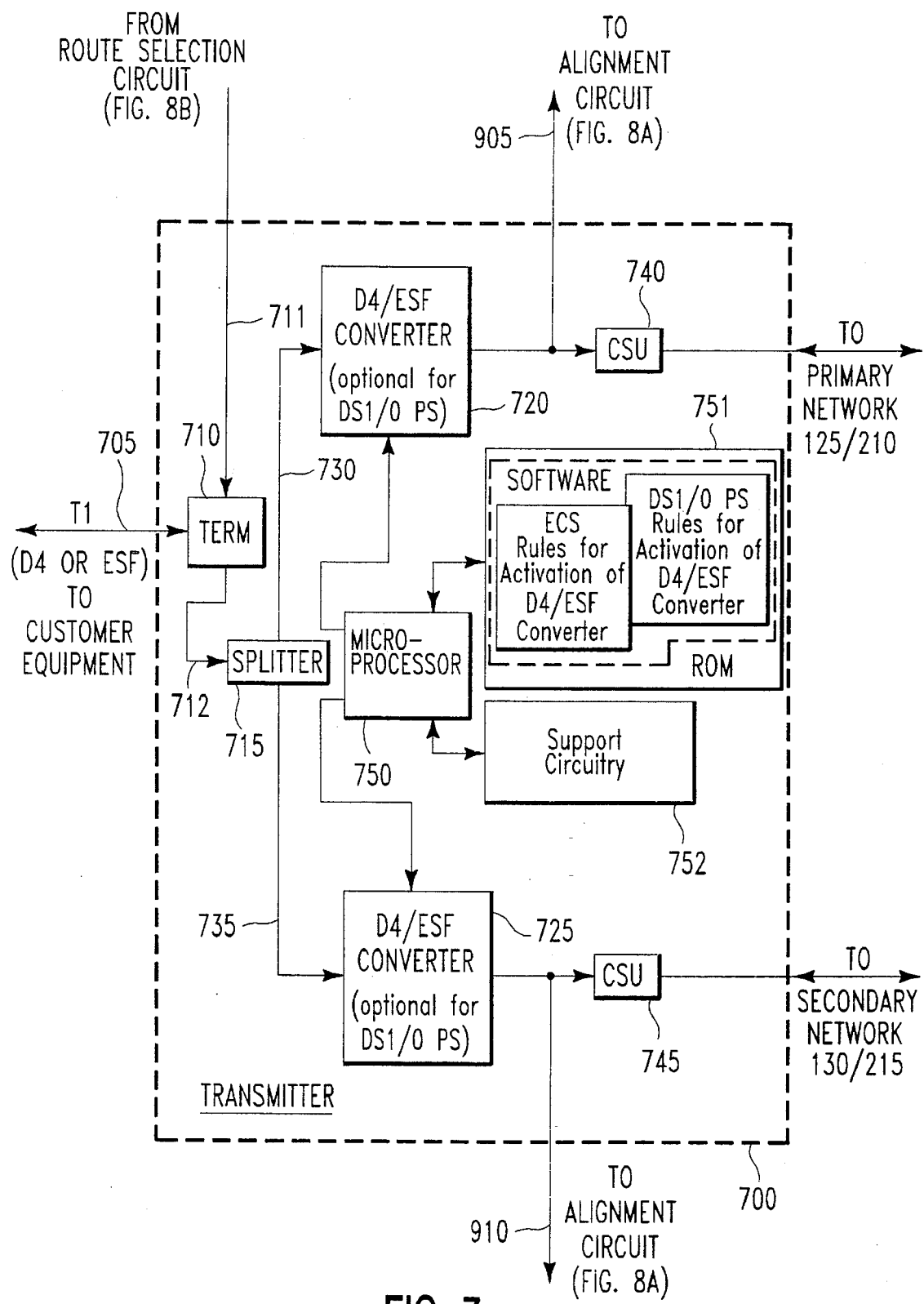
FIG. 7 is a high-level block diagram of illustrative transmitter 700, in accordance with the present invention, for a communications system having route diversity.

FIG. 7 depicts, in accordance with the present invention, transmitter 700 which combines the transmitting capabilities of the conventional ECS and DS1/0 PS into one transmitter arrangement. Transmitter 700 operates in either an ECS mode or a DS1/0 PS mode as controlled by microprocessor 750.

Microprocessor 750 operates in conjunction with read-only-memory (ROM) 751 and support circuit 752. An illustrative microprocessor is a type 68HC11 microprocessor manufactured by Motorola, Inc. of Phoenix, Ariz. ROM 751 stores algorithms which control the activation of D4/ESF converters 720 and 725. Operation of the converters is discussed below. As is well-known in the art, microprocessors operate in conjunction with a variety of support circuitry, such as random-access-memory (RAM), buffers, clocks and the like. Since such circuitry is well-known in the art, further details of the support circuitry, shown generally as support circuitry 752, will not be presented.

When operating in the ECS mode, transmitter 700 receives an incoming data stream which is either in the D4 or ESF format. Generally, the transmitter duplicates the incoming data stream and transmits the duplicated streams onto both primary and secondary ESF networks 125 and 130. Illustratively, the incoming stream from the customer equipment is in D4 frame format; link 705 delivers this stream to terminal port 710. Terminal port 710 is merely a hybrid for interfacing bidirectional link 705 with unidirectional links 711 and 712. Link 711 carries a T1 formatted signal for output to the customer equipment from the route selection circuit depicted in FIG. 8B and described below. Link 712, in FIG. 7, connects terminal port 710 to splitter 715. Splitter 715 replicates the D4 stream to derive two separate streams in D4 format. Lines 730 and 735 carry each replicated stream to D4/ESF converters 720 and 725, respectively. D4/ESF converter 720 converts the signal in D4 format on line 730 to ESF format and sends the ESF formatted signal to CSU 740. CSU 740 then propagates the derived ESF stream over primary network 125. Similarly, D4/ESF converter 725 independently converts the signal in D4 format on line 735 to ESF format and sends the ESF formatted signal to CSU 745. CSU 745 then propagates the derived ESF stream over secondary network 130. Alternatively, if the incoming digital stream derived via link 705 is already in ESF format, microprocessor 750 using software stored in ROM 751 disables D4/ESF converters 720 and 725.

During operation in the DS1/0 PS mode, transmitter 700 accepts data on link 705 in any T1 format, i.e., either D4 or ESF. This data is passed through terminal port 710 to splitter 715 where the data is replicated into two identical T1 formatted data streams on lines 730 and 735, respectively. In contrast with the ECS, T1 network facilities for the DS1/0 PS can be either D4 or ESF. In fact, it is permissible for the two redundant T1 network facilities connected to the same DS1/0 PS to utilize different framing formats. Therefore, converters 720 and 725 may be either disabled or enabled during DS1/0 PS operation depending upon the present application and network access. If the D4/ESF converters are disabled, the T1 formatted data on lines 730 and 735 are passed directly to CSU 740 and CSU 745, respectively, and then transmitted onto primary network 210 and secondary network 215, respectively. However, if framing format conversion is required, then microprocessor 750 using software stored in ROM 751 enables one or both converters 720 or 725 as necessary.

As is apparent from the foregoing discussion, transmitter 700 can be operated either as an ECS transmitter or a DS1/0 PS transmitter. Thus, a single hardware transmitter design produces either ECS or DS1/0 PS functions in accordance with the objectives of the present invention.

B. Receiver Arrangement

Figure 8B:
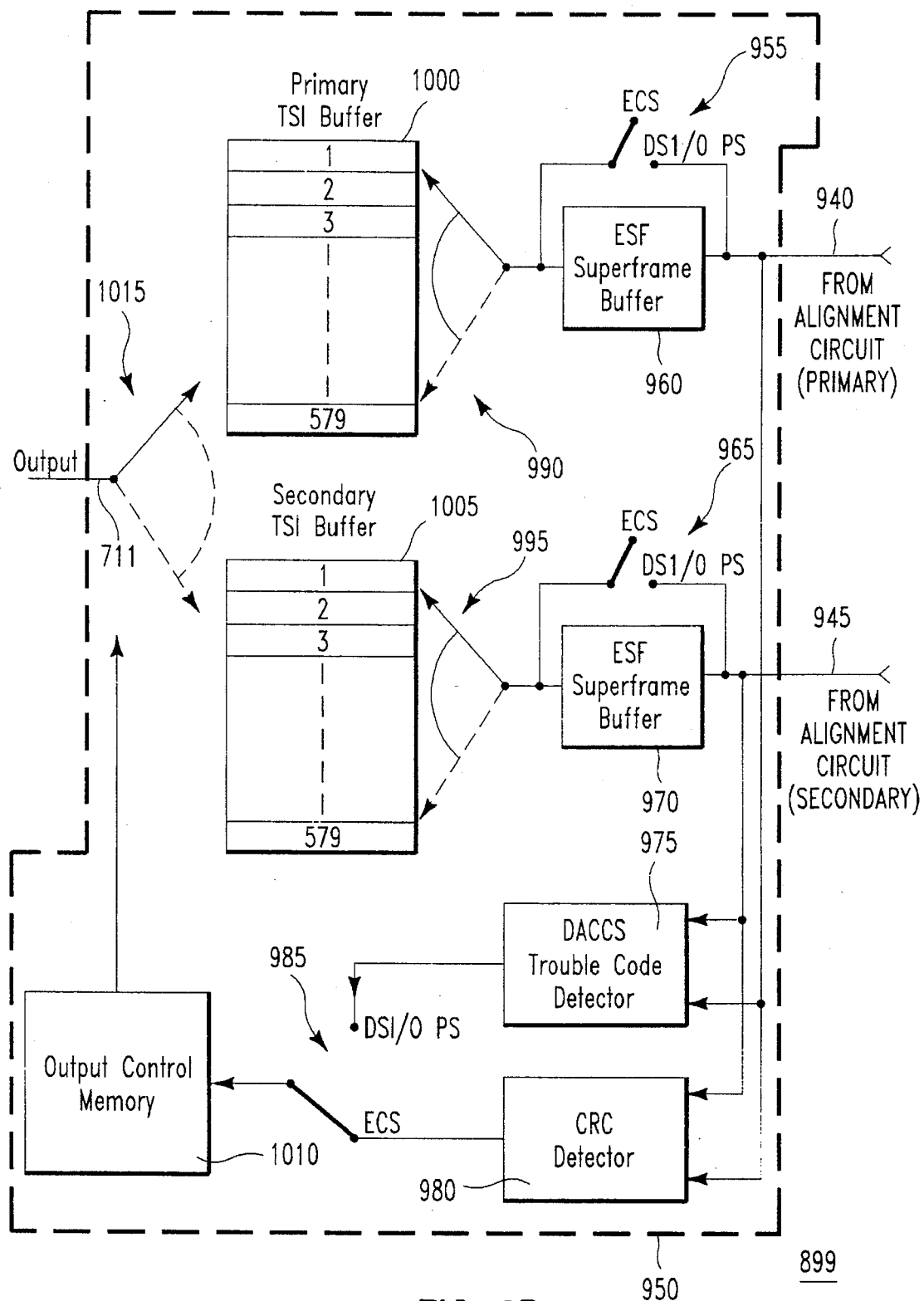
FIG. 8B is a high-level block diagram of illustrative route selection circuitry 950 also situated within receiver 899, in accordance with the present invention, which implements a combination of an Error Correction Switch and a DS1/0 Protection Switch.

To accomplish both ECS and DS1/0 PS receiver functions, my inventive receiver utilizes an arrangement of memory buffers which store received data from redundant T1 networks to which the receiver is connected. Additionally, the receiver monitors the stored data for either CRC-6 codes or DACCS trouble codes and selects a block of data for output from one of the memory buffers depending upon whether the CRC-6 code is correct or a DACCS trouble code is contained in the data. To accomplish buffering and evaluation of the received data, the invention relies on a time-slot interchange process that is discussed in detail below. FIG. 8 shows the proper alignment of FIGS. 8A and 8B. Taken together, FIGS. 8A and 8B depict the component circuits which comprise receiver 899, namely, FIG. 8A, frame alignment circuit 900, and FIG. 8B, route selection circuit 950.

As discussed previously, at the far end of a network, the conventional ECS and DS1/0 PS merge the two copies of the data received from the two separate T1 network facilities. In either of the protection switch modes, ECS or DS1/0 PS, the received data must be aligned to facilitate accurate merger of the data. Thus, the inventive apparatus must perform an appropriate alignment function corresponding to each mode of operation.

FIG. 8A shows a block diagram of alignment circuit 900. Two independent T1 signals enter alignment circuit 900 on lines 905 and 910. Each signal passes through built-in CSUs 740 and 745 shown in the transmitter diagram of FIG. 7. As shown in FIG. 8A, the signals from each CSU connect directly to first and second alignment buffers 915 and 920, respectively. The signal from CSU 740 enters first alignment buffer 915; similarly, the signal from CSU 745 enters second alignment buffer 920. When in the ECS mode, microprocessor 750 uses ECS differential delay alignment algorithm 930 (stored in ROM 751) in conjunction with alignment control circuit 907 to align the two T1 signals received from the primary and secondary networks at a bit level. Alternatively, when operating in the DS1/0 PS mode, microprocessor 750 uses DS1/0 PS superframe alignment algorithm 935 (stored in ROM 751) in conjunction with alignment control circuit 907 to align the T1 signals at a superframe level. Alignment algorithms 930 and 935 are discussed in detail below.

Significantly, the alignment mechanism is different for each mode. Therefore, the alignment circuit uses a microprocessor, typically the same microprocessor used in the transmitter, that permits the user to select the appropriate alignment function that corresponds to the current mode of operation of the switch. The operation of the alignment circuit is best understood with respect to each mode of operation. Thus, each mode is described separately below.

When operating in the DS1/0 PS mode, alignment circuit 900 shown in FIG. 8A must align two incoming T1 signals (bit streams) at a superframe level under the control of DS1/0 PS superframe alignment algorithm 935. Superframe alignment ensures end-to-end integrity of signaling bits contained in the received superframes. To achieve superframe alignment when operating in the DS1/0 PS mode, one of the two T1 bit streams on lines 905 and 910 is delayed until the framing bits (also known as a framing sequence) in the two T1 bit streams are aligned. Buffering of up to one ESF superframe, i.e., 24 T1 frames or 4,632 bits, in either the primary or secondary receive path is sufficient for superframe alignment. Since the D4 superframe is only half the size of the ESF superframe, i.e., 12 T1 frames or 2,316 bits, a 4,632-bit buffer is sufficient for alignment of data formatted in either of the two superframe formats. However, as is noted below, to accommodate operation in the ECS mode, the buffer is much larger than 4,632 bits; specifically, each buffer stores 463,200 bits.

The DS1/0 PS mode does not compensate for differential delay between the primary and secondary routes that each individual DS0 within a frame may traverse. Due to the fact that not all 24 DS0's within a T1 transmission originate at one customer site and terminate at a single site at the far end, a variety of propagation delays exist for the various DS0's within a T1 transmission. Therefore, for each of the 24 DS0's, there is a unique differential propagation delay between the primary and secondary routes. Compensation for this differential delay for each individual DS0 is not conveniently achieved. However, the various differential delays are not considered unnecessarily restrictive because the delays do not effect the end-user unless the route selection circuit performs a fractional T1 switchover. Furthermore, the fractional T1 switchovers, caused by network facility outages, occur very infrequently. Nonetheless, should a fractional T1 switchover occur, the end-user only encounters a momentary "hit" in the data stream. Fractional T1 switchovers are discussed in detail with respect to the route selection circuit discussed below.

Specifically, alignment circuit 900 comprises alignment buffers 915 and 920, alignment control circuit 907 and alignment software 925. To effectuate the superframe level alignment for operation in the DS1/0 PS mode, microprocessor 750 using DS1/0 PS superframe alignment algorithm 935 stored in ROM 751, controls alignment control circuit 907. Note that the same microprocessor, ROM and support circuit used to control transmitter 700 shown in FIG. 7, may be used to control the alignment circuit. In operation, alignment control circuit 907, as shown in FIG. 8A, detects the framing bits in each T1 bit stream and inserts an appropriate amount of delay in first alignment buffer 915 to align the framing bits in the T1 bit streams. As a result, alignment circuit 900 aligns the T1 bit streams on lines 940 and 945 at the superframe level and, consequently, the signals are ready for subsequent merger by the route selection circuit. The foregoing description of DS1/0 PS superframe alignment algorithm 935 is sufficient for those skilled in the art to readily produce such software.

The ECS mode uses a different alignment function than described above. In the ECS mode, all 24 DS0's originate at one site and terminate at the same site at the far end. Thus, all 24 DS0's in the T1 signal have the same propagation delay. However, each network through which the T1 signal has propagated has its own propagation delay. Therefore, in comparing the T1 signals from each network, a differential delay between the received signals is typically evident. Nonetheless, this type of differential delay is easily compensated.

As discussed previously, the two redundant T1 network facilities generally have different propagation delays. Generally speaking and as discussed in greater detail below, the ESF superframe arriving first on either lines 905 or 910, because of a shorter propagation time on one of the redundant T1 network facilities, is delayed until the received ESF superframe is matched bit-for-bit with a corresponding ESF superframe from the other T1 network facility. The positions of the information and framing bits are both monitored to determine the amount of delay to be inserted into the shorter electrical path by alignment buffers 915 and 920. Two redundant network facilities that support ESF may have up to 300 msec of differential delay between the primary and secondary routes. Given a 1.544 Mbps transmission rate, this will require buffering of up to 463,200 bits. Thus, first alignment buffer 915 and second alignment buffer 920 can store up to 463,200 bits.

Specifically, differential delay alignment algorithm 930 accomplishes alignment of the ESF superframes using a two step process. First, alignment circuit 900 aligns the stored ESF superframes on a superframe level by aligning the framing sequences. Second, the alignment circuit compares the information bits, i.e., 4,608 bits, within an ESF superframe stored in first alignment buffer 915 with the information bits in an ESF superframe in second alignment buffer 920. A counter (not specifically shown), within microprocessor 750, maintains a count of a number of mismatched bits resulting from the comparison. If at the end of the 4,608 bit comparison, the count is greater than 12, i.e., an error rate of more than $12/9216$ or $1.3 \times 10^{-3}$, the microprocessor selects another ESF superframe from the second alignment buffer for comparison to the current selection from the first alignment buffer. The newly selected ESF superframe is typically a superframe just prior to the superframe previously selected. In other words, if the initial ESF superframe selected for the comparison from the second alignment buffer was in location x, the second selection is in location x−1. If a satisfactory error rate is not produced, another ESF superframe is selected from the second alignment buffer, illustratively from location x+1. The process repeats until an ESF superframe in the second alignment buffer having less than 13 mismatched bits is found. Illustratively, the search proceeds with the following exemplary superframe location pattern: x−2, x+2, x−3, x+3, and so on. Once a substantial match is found, the time differential between the substantially matched ESF superframes, i.e., their relative locations in the first and second alignment buffers, indicates the delay necessary to align all subsequently received ESF superframes at a bit level.

If the primary T1 facility is the shorter electrical path, then first alignment buffer 915 in the primary receive path is enabled to compensate for the differential delay between the two routes. On the other hand, if the secondary T1 facility is the shorter electrical path, then second alignment buffer 920 in the secondary receive path is enabled. Thus, two 463,200 bit buffers, one in the primary and the other in the secondary receive path, are sufficient to satisfy alignment requirements for both the ECS and DS1/0 PS modes. The foregoing discussion of ECS differential delay alignment algorithm 930 is sufficient for those skilled in the art to readily produce such software.

Once the data streams from each network are aligned, the invention uses a time-slot interchanging (TSI) operation as the basis for a protection switch capable of accomplishing both ECS and DS1/0 PS functions. To understand the operation of the invention, it is best to review the fundamentals of the TSI process before discussing the details of my inventive route selection circuit.

Figure 9:
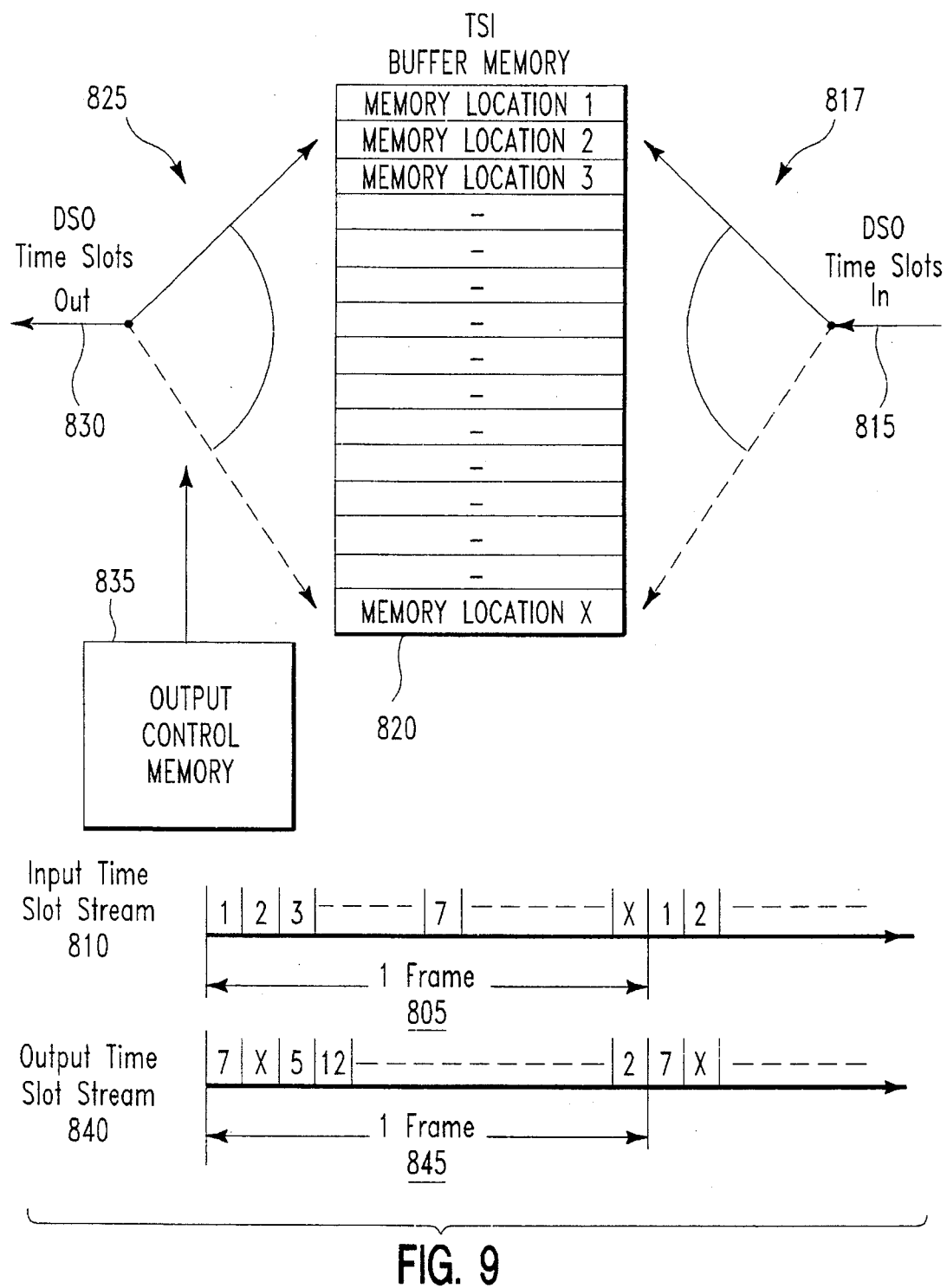
FIG. 9 illustrates, in high-level block diagram form, hardware for implementing a time-slot interchanging process.

FIG. 9 depicts a simplified block diagram of an illustrative hardware arrangement for implementing a TSI process. The hardware comprises TSI buffer memory 820, input pointer 817, output pointer 825 and output control memory 835. As is well-known in the art, in digital networks, information is transmitted in time-slots to establish communication channels. Illustratively, frame 805 consisting of DS0's located in time-slots 1 to X is shown as input time-slot stream 810. Generally, TSI buffer memory 820 buffers the DS0 time-slots such that data in each time-slot at input 815 enters, via input pointer 817, TSI buffer memory 820. Input pointer 817 stacks the data from each time-slot, one slot at a time, into memory locations 1 to X. Memory 820 stores each DS0 data block, i.e., data in each time-slot in the input time-slot stream, at a single memory location therein. For example, the TSI process always places the data block in time-slot 1 into memory location 1, time-slot 2 into memory location 2, and so on. This data storage process is known as a direct sequential write. In direct sequential write, as each new frame is processed, each memory location of buffer memory 820 storing data of the previous frame is overwritten by the data in the new frame.

Output pointer 825 subsequently accesses the DS0's in buffer memory 820 in a manner which can re-order the DS0's to create illustrative output time-slot stream 840 at output 830. Output control memory 835 controls pointer 825. Illustrative output frame 845 depicts the DS0's as re-ordered by control memory 835 into an arbitrary order. Illustratively, output pointer 825 generates output line stream 840 by placing data from memory location 7 in time-slot 1, memory location X in time-slot 2, memory location 5 in time-slot 3, memory location 12 in time-slot 4, and so on. Overall, this process sequentially writes data into buffer memory 820 and randomly reads data from buffer memory 820. Consequently, the process is known as sequential-write random-read memory access. Using this buffering technique, DS0 data blocks can be re-ordered into any order desired by controlling pointer 825 with memory 835.

Now, returning to the discussion of the present invention, after the two T1 bit streams are aligned by the alignment circuitry shown in FIG. 8A, the route selection circuitry shown in FIG. 8B stores both aligned bit streams in TSI buffers, and evaluates the two bit streams. Subsequently, the route selection circuitry selects the data received from either the primary or secondary network facilities depending on the outcome of the evaluation. The route selection circuitry passes, via a terminal port, the selected data to the customer equipment.

Specifically, FIG. 8B is a block diagram of route selection circuit 950 having the capability of operating in either an ECS mode or a DS1/0 PS mode. Generally, circuit 950 operates using the time-slot interchanging process previously discussed. In operation, primary TSI buffer 1000 and secondary TSI buffer 1005 store, as data, the bit streams previously aligned by the alignment circuit. The route selection circuit generates an output signal on line 711 by selecting data stored in either TSI buffer depending upon whether the data has met certain criteria measured by either CRC detector 980 or DACCS trouble code detector 975.

To select a mode of operation, switches 955, 965 and 985 are positioned in either an ECS position for circuit operation in the ECS mode or a DS1/0 PS position for circuit operation in the DS1/0 PS mode. The operation of circuit 950 in the DS1/0 PS mode is discussed first. Specifically, to operate circuit 950 as a DS1/0 PS, switches 955, 965, and 985 are positioned in the "DS1/0 PS" position. As such, both ESF superframe buffers 960 and 970 are by-passed and output control memory 1010 receives instruction from DACCS trouble code detector 975.

Figure 10:
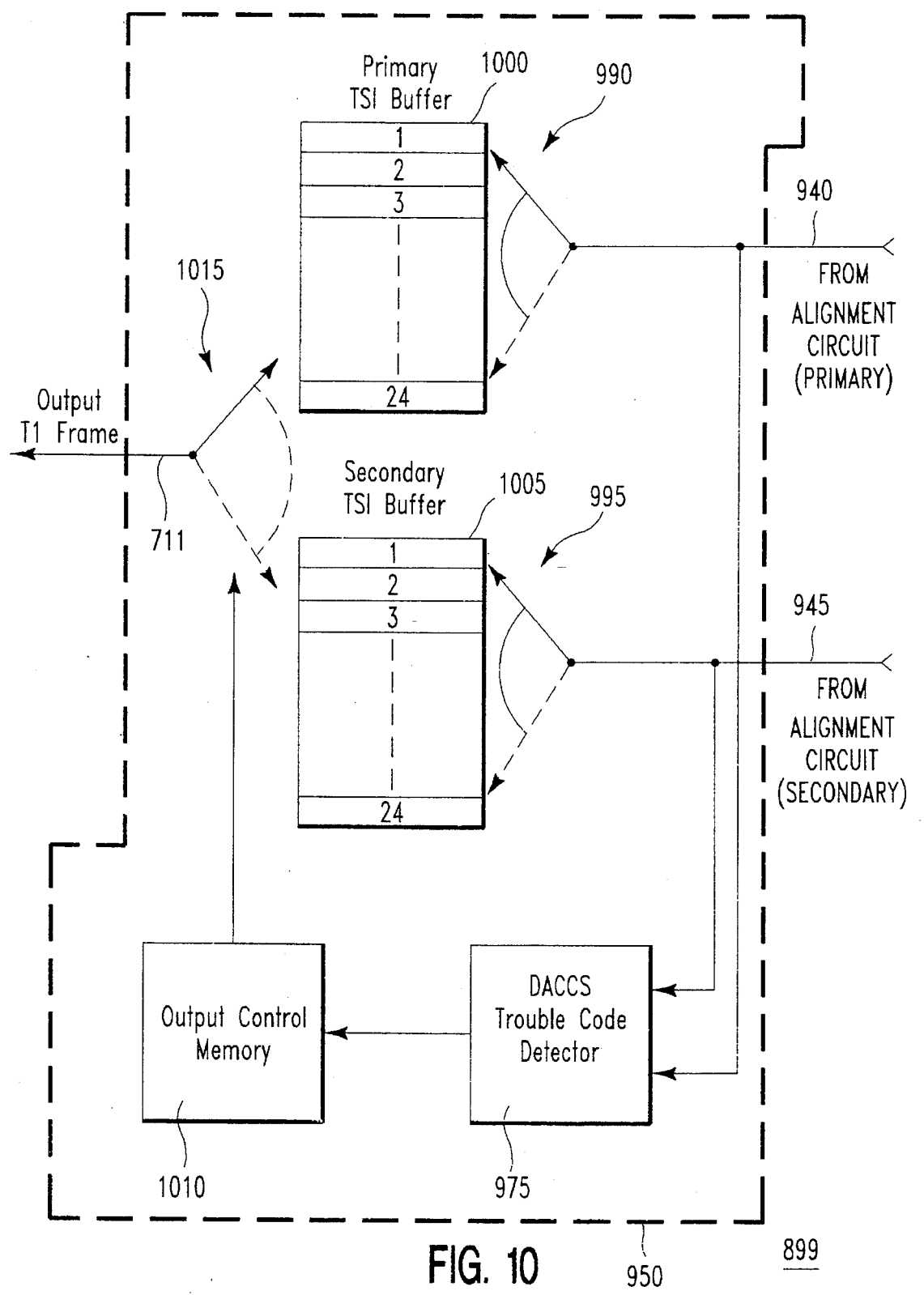
FIG. 10 illustrates, in high-level block diagram form, route selection circuitry 950, of FIG. 8B, operating as a DS1/0 Protection Switch.

FIG. 10 depicts route selection circuit 950 in the DS1/0 PS mode. In this mode, route selection circuit 950 activates primary and secondary TSI buffers 1000 and 1005, DACCS trouble code detector 975, and output control memory 1010. In operation, TSI buffers 1000 and 1005 store the 24 individual DS0's, i.e., a total of 192 bits, which comprise each T1 frame received from the primary and secondary networks, respectively. The 193rd bit, the framing bit in each frame, is disregarded. Pointers 990 and 995 sequentially write the DS0's into TSI buffers 1000 and 1005, respectively. To accommodate the DS0's, each memory location must store 8 bits, i.e., the number of bits in a single DS0. Simultaneously with the storage of each DS0, DACCS trouble code detector 975 monitors the primary and secondary T1 bit streams searching for a trouble code in every DS0 within each T1 frame, i.e., the DACCS trouble code detector looks for a match between the bits in each DS0 and a known trouble code. Such detector circuits are well-known in the art. The trouble code detector informs output control memory 1010 which of the DS0's from either the primary or secondary network contains a trouble code. Subsequently, output control memory 1010 controls pointer 1015 to "read" an 8-bit memory location from either the primary or secondary TSI buffer 1000 or 1005. The DS0's are successively read from the buffers, via pointer 1015, to generate a new T1 frame. The new T1 frame comprises DS0's selected from either the primary or secondary TSI buffers 1000 and 1005 and sequentially positioned in successive time-slots within the new T1 frame.

Upon initializing a network system utilizing the invention in the DS1/0 PS mode, primary TSI buffer 1000 passes all 24 DS0's from the incoming bit stream to an output on line 711. However, if a trouble code is present in any of the active DS0 time-slots for 100 milliseconds and if there is not a trouble code within the last ten milliseconds of the 100 millisecond period in the corresponding DS0 stored in the secondary TSI buffer, DACCS trouble code detector 975 initiates an update of output control memory 1010. This action leads to a DS0 switchover to an alternative network route. In other words, output control memory 1010 selects a DS0 from the other (secondary) TSI buffer to replace the DS0 containing the trouble code.

If a trouble code is detected in a DS0 associated with a fractional T1 channel, a switchover occurs for all of the DS0's within that fractional T1 channel notwithstanding the trouble code status of each individual DS0 comprising the fractional T1 channel. In this manner, the invention avoids potential synchronization errors that would arise if the DS0's comprising a single fractional T1 channel were routed through two networks each having a different propagation delay. By way of example and in accordance with the previous example described with reference to a conventional DS1/0 PS, upon initial power-up, all 24 DS0's in a frame are read out sequentially from primary TSI buffer 1000. That is to say, pointer 1015 places data from memory location 1 in the primary TSI buffer into the outgoing T1 frame on line 711 in time-slot 1, data memory location 2 in the primary TSI buffer is placed in time-slot 2, and so on. For this example, it is assumed that the protection switch is located at site A and that time-slots 1–5 contain DS0's from site C, time-slots 6–15 contain DS0's from site D and time-slots 16–24 contain DS0's from site E. In the initial state, all primary network routes are active and all secondary network routes are alternate. For each subsequent T1 frame, this operative state remains constant until DACCS trouble code detector 975 detects a DACCS trouble code in one of the active DS0's. For instance, if detector 975 continuously detects a DACCS trouble code for 100 msec in time-slot 7 of a frame on the active network route and if a trouble code has not been detected within ten milliseconds prior to the end of the 100 msec period in the corresponding time-slots 6 through 15 from the alternate network, DACCS trouble code detector 975 updates a random-read routine stored in output control memory 1010. As stated above, if a trouble code is detected in a DS0 associated with a fractional T1 channel, a switchover for all of the DS0's within that fraction T1 channel should switch to an alternate network. The update modifies the readout sequence of the time-slot interchanging process and thus, initiates a fractional T1 channel switchover. The new readout sequence for the time-slots in the outgoing T1 bit stream is as follows: time-slots 1–5 and 16–24 are read from primary TSI buffer 1000 and time-slots 6–15 are read from secondary TSI buffer 1005. This new readout sequence repeats for each subsequent T1 frame until detector 975 detects another trouble code in an active DS0's. Thus, after a switchover, the 24 DS0's produced on line 711 are derived from both the primary and the secondary networks.

To prevent an unwarranted hit in the output bit stream, the receiver does not revert to the previously utilized fractional T1 route unless detector 975 detects a trouble code in the active fractional T1 route. As mentioned above, a hit is caused by the fact that the DS1/0 PS does not compensate for the propagation delay difference between the primary and the secondary fractional T1 routes.

As is apparent from the foregoing discussion, my invention, when operating in the DS1/0 PS mode, is functionally identical to a conventional DS1/0 PS; thus, assuring complete compatibility with conventional DS1/0 PS hardware.

Next, the operation of route selection circuit 950 in the ECS mode is discussed. To place circuit 950 into the ECS mode, switches 955, 965 and 985 (FIG. 8B) are each positioned in the "ECS" position. As such, circuit 950 will error correct ESF superframes received from the primary and secondary networks, via the alignment circuit (not shown).

Figure 11:
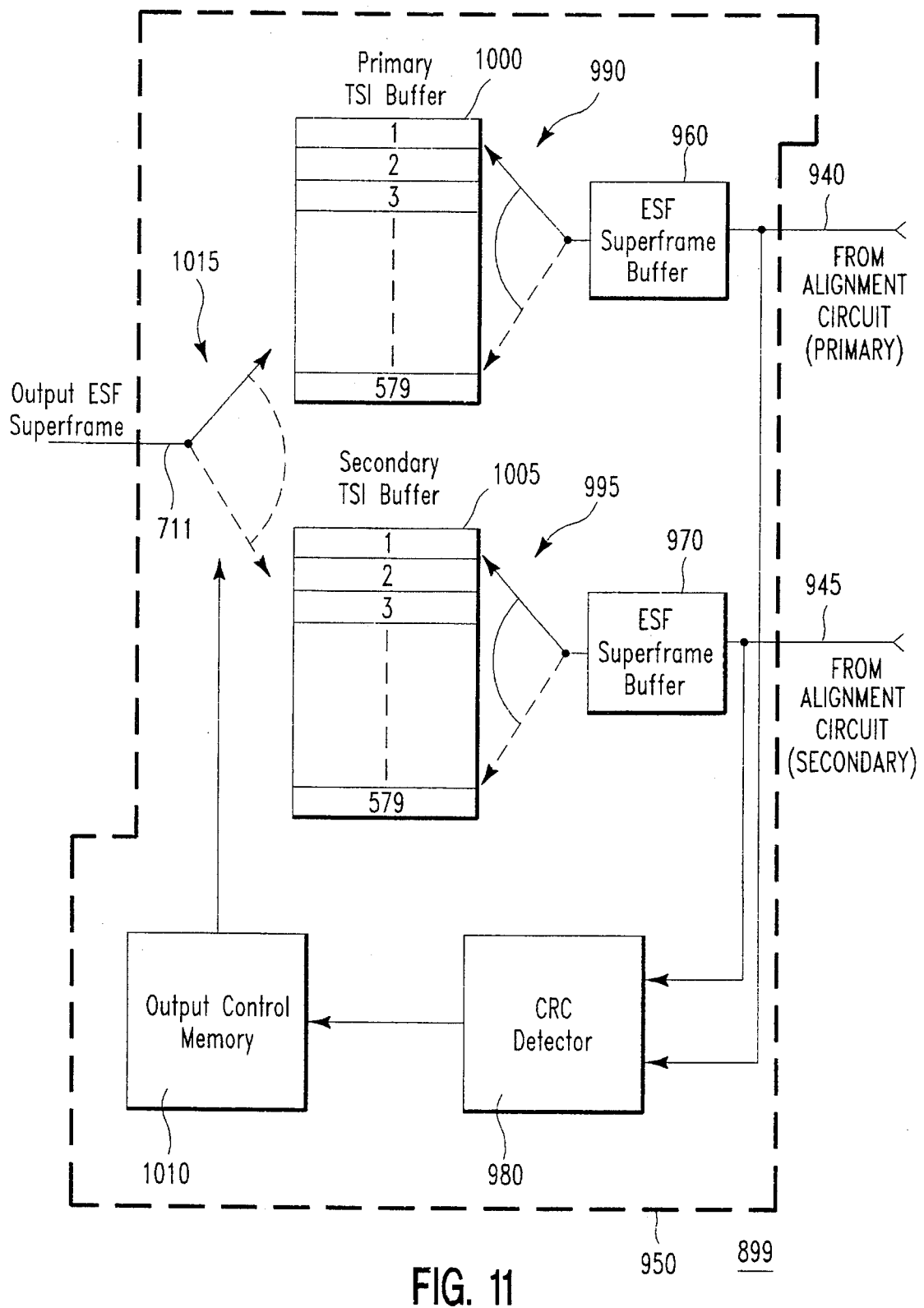
FIG. 11 illustrates, in high-level block diagram form, route selection circuitry 950, of FIG. 8B, operating as an Error Correction Switch.

FIG. 11 depicts route selection circuit 950 operating in the ECS mode. As such, route selection circuit 950 now activates ESF superframe buffers 960 and 970, primary and secondary TSI buffers 1000 and 1005, CRC detector 980, and output control memory 1010. As previously discussed, each ESF superframe received, on lines 940 and 945, from the alignment circuit contains 4632 bits, that is, 4608 information bits and 24 overhead bits. Hereinafter, each ESF superframe received from the primary network is designated a primary ESF superframe and each ESF superframe received from the secondary network is designated a secondary ESF superframe. As was described previously with regard to the conventional ECS, to appropriately select an uncorrupted ESF superframe, CRC detector 980 dynamically evaluates both the primary and secondary ESF superframes simultaneously as they are received. The CRC detector computes the CRC-6 code for each primary and secondary ESF superframe in the manner described previously. The computed CRC-6 code of both ESF superframes is then compared to a CRC-6 check sub-sequence contained in the following ESF superframe, hereinafter the second ESF superframe. If the computed CRC-6 code does not match the CRC-6 check sub-sequence, that is an indication that one or more logical errors have occurred in the transmission of the information bits contained in the first ESF superframe. Storing two consecutive ESF superframes from each network, the first in TSI buffers 1000 and 1005 and the second in ESF superframe buffers 960 and 970, respectively, enables the route selection circuit to conduct the calculation of the CRC-6 code on the first ESF superframe and compare the result with the CRC-6 check sub-sequence contained in the second ESF superframe for ESF superframes received from each network.

A significant difference between the ECS mode and the DS1/0 PS mode is the size of the T1 bit stream which is switched (or selected) by the time-slot interchanging process. In the DS1/0 PS mode, eight-bit blocks (DS0 time-slots) are individually selected from either the primary or secondary T1 bit stream. In the ECS mode, the selected data block is the entire ESF superframe, a group of 4,632 bits stored in one or the other TSI buffer.

As previously discussed with regard to the DS1/0 PS mode, for TSI buffers 1000 and 1005 to store individual DS0's, the buffers are required to have 8-bit memory locations. To utilize a single pair of buffers for both the ECS and DS1/0 PS operation, memory locations within buffers 1000 and 1005 are maintained at 8 bits each. However, to store all 4,632 bits of the ESF superframe requires 579 8-bit memory locations for both the primary and secondary TSI buffers. In the DS1/0 PS mode, only 24 of the 579 memory locations are utilized.

It is important to note that in the ECS mode, there is no direct relationship between the memory locations in the TSI buffers and the DS0 time-slots within a superframe, as there is in the DS1/0 PS mode. Furthermore, the TSI buffers store all 4,632 bits of the ESF superframes in sequential 8-bit segments. A relationship between the memory locations and the DS0 time-slots is only important in the DS1/0 PS mode where pointer 1015 individually selects a data block for each individual DS0 time-slot from either the primary or secondary TSI buffer. In the ECS mode, pointer 1015 selects an entire ESF superframe from either the primary or secondary TSI buffer. Thus, there is no need to be concerned with storing the data in each time-slot in its own individual memory location.

In operation, route selection circuit 950 receives two first ESF superframe from the alignment circuit (FIG. 8A) on lines 940 (primary) and 945 (secondary), respectively. As shown in FIG. 11, each first ESF superframe, a primary and a secondary, is initially stored in ESF superframe buffers 960 and 970, respectively. Each of the ESF superframe buffers 960 and 970 stores 4,632 bits, i.e., one entire ESF superframe. As the first ESF superframes are received, CRC detector 980 computes the CRC-6 code for both first ESF superframes. Subsequently, two second ESF superframe arrive on lines 940 and 945, respectively, pushing the first ESF superframes out of ESF superframe buffers 960 and 970 and into primary and secondary TSI buffers 1000 and 1005, respectively. Primary and secondary TSI buffers store each bit of the first ESF superframe in sequential order in 8-bit memory locations 1–579 using pointers 990 and 995. As each ESF superframe is being loaded into buffers 960 and 970 from the alignment circuitry, CRC detector 980 computes the CRC-6 codes for each newly received ESF superframe and simultaneously reads the CRC-6 check subsequence associated with the previous (first) ESF superframes. The CRC-6 check sub-sequence read from each second ESF superframe is then compared to the computed CRC-6 code of each of the first ESF superframes for both the primary and secondary ESF superframes. If a logical error is indicated for the ESF superframe stored in primary TSI buffer 1000, i.e., the CRC-6 code and check sub-sequence do not match, and no logical error is indicated for the ESF superframe stored in secondary TSI buffer 1005, then output control memory 1010 is updated by detector 980. The output control memory instructs pointer 1015 to select the superframe stored in secondary TSI buffer 1005 by sequentially accessing all of the memory locations from 1 through 579. Consequently, this selection recreates on output line 711 the first ESF superframe that was received on line 945. Alternatively, if however, a logical error is not found in the ESF superframe stored in the primary TSI buffer and a logical error is found in the ESF superframe stored in the secondary TSI buffer, then output control memory 1010 instructs pointer 1015 to select the ESF superframe stored in primary TSI buffer 1000. The entire selected ESF superframe is sent to line 711 by sequentially reading each memory location, 1 through 579, to recreate the first ESF superframe that was received on line 940. If both ESF superframes received on lines 940 and 945 are either corrupted such that logical errors are indicated for both superframes or no logical errors are indicated in either superframe, then output control memory 1010 selects the ESF superframe stored in either primary or secondary TSI buffers 1000 or 1005 depending upon the recent history of errors for both networks. Consequently, the control memory selects the ESF superframe from the network showing the least number of errors in recent history.

The process of reading an ESF superframe from either the primary or secondary TSI buffer is performed sequentially for each subsequent ESF superframe in the T1 bit stream. Therefore, the random-read routine stored in output control memory 1010 must be continuously updated by the CRC detector for each ESF superframe.

Due to the fact that the superframes are aligned and buffered in their entirety during the error calculations, it is possible to switch hitlessly between the primary and secondary network routes. That is, two entire ESF superframes from each route are aligned in the alignment circuit and buffered in the route selector circuitry to ensure that when a superframe selection is accomplished none of the data in the ESF superframe is lost, i.e., hitless operation.

As is apparent from the foregoing discussion, my invention, when operating in the ECS mode, is functionally equivalent to a conventional ECS; thus, assuring complete compatibility with conventional ECS hardware.

It is to be understood that the above-described embodiment is simply illustrative of the application of the principles in accordance with the present invention. Other embodiments may be readily devised by those skilled in the art which may embody the principles in spirit, in scope. Thus, it is to be further understood that the methodology described herein is not limited to the specific forms shown by way of illustration but may assume other embodiments limited only by the scope of the appended claims.

I claim:

1. An apparatus for connecting a primary network and a secondary network to an output port, wherein the primary network and the secondary network carry redundant digital data using either a point-to-point network topology or a point-to-multi-point network topology, the apparatus comprising:

a primary buffer means for receiving and storing the redundant digital data from the primary network;

a secondary buffer means for receiving and storing the redundant digital data from the secondary network;

a detection means for detecting errors in the redundant digital data stored in the primary buffer means and the secondary buffer means;

a control means for providing digital data to the output port from the primary buffer means and the secondary buffer means based on the detection means; and a switch means for switching the apparatus between a configuration operable with the point-to-point network topology and a configuration operable with the point-to-multipoint network topology wherein the switching is based on which particular topology is used.

2. An apparatus for connecting a primary network and a secondary network to an output port, wherein the primary network and the secondary network carry redundant digital data in Extended Super Frame (ESF) format using either a point-to-point topology or a point-to-multipoint topology, said apparatus comprising:

a primary alignment buffer connected to the primary network and operable to receive the data from the primary network;

a secondary alignment buffer connected to the secondary network and operable to receive the data from the secondary network;

an alignment means for aligning the data in the primary alignment buffer with the data in the secondary alignment buffer;

a primary ESF buffer;

a secondary ESF buffer;

a primary time slot interchange (TSI) buffer;

a secondary TSI buffer;

a detection means for checking a cyclic redundancy check (CRC-6) in data stored in the primary ESF buffer against a calculation of the CRC-6 for data stored in the primary TSI buffer, for checking a CRC-6 in data stored in the secondary ESF buffer against a calculation of the CRC-6 for data stored in the secondary TSI buffer, and for detecting digital access cross-connect (DACCS) trouble codes in the data stored in the primary TSI buffer and in the data stored in the secondary TSI buffer;

a switching means for transferring the data from the primary alignment buffer to the primary ESF buffer, from the primary ESF buffer to the primary TSI buffer, from the secondary alignment buffer to the secondary ESF buffer, and from the secondary ESF buffer to the secondary TSI buffer when the apparatus operates with a point-to-point network topology, for transferring the data from the primary alignment buffer to the primary TSI buffer, and from the secondary alignment buffer to the secondary TSI buffer when the apparatus operates with a point-to-multipoint network topology, for configuring the detection means to check the CRC-6 when the apparatus is operating with the point-to-point network topology and for configuring the detection means to detect DACCS trouble codes when the apparatus is operating with the point-to-multipoint network topology; and an output means for selecting the data from the primary TSI buffer and from the secondary TSI buffer based on the detection means and for providing the selected data to the output port in ESF format.

3. A method for operating an apparatus to connect a primary network and a secondary network to an output port, wherein the primary network and the secondary network carry redundant digital data using either a point-to-point network topology or a point-to-multipoint network topology, the method comprising:

receiving and storing digital data from the primary network;

receiving and storing digital data from the secondary network;

detecting errors in the gored digital data from the primary network and in the stored distal data from the secondary network;

providing errorless digital data to the output port based on the error detection; and switching the apparatus between a configuration operable with the point-to-point network topology and a configuration operable with the point-to-multipoint network topology wherein the switching is based on which particular topology is used.

4. The method of claim 3 further comprising aligning the stored data from the primary network and the stored data from the secondary network.

5. The method of claim 3 wherein detecting errors in the data comprises detecting digital access cross-connect (DACCS) trouble codes in the data.

6. The method of claim 5 wherein receiving the digital data comprises receiving the digital data in extended superframe (ESF) format.

7. The method of claim 6 wherein detecting errors in the data comprises checking a cyclic redundancy check (CRC-6) in the data.

8. The method of claim 7 wherein switching the apparatus comprises switching to a configuration to check the CRC-6 when the apparatus is operating with the point-to-point network topology and switching to a configuration to detect DACCS trouble codes when the apparatus is operating with the point-to-multipoint network topology.

\* \* \* \* \*

UNITED STATES PATENT AND TRADEMARK OFFICE
CERTIFICATE OF CORRECTION

PATENT NO. : 5,506,956
DATED : April 9, 1996
INVENTOR(S) : Aaron Y. Cohen

It is certified that error appears in the above-indentified patent and that said Letters Patent is hereby corrected as shown below:

In Claim 3, line 21, delete "gored" and substitute --stored--; line 22, delete "distal" and substitute --digital--.

Signed and Sealed this

Eighteenth Day of February, 1997

Attest:

BRUCE LEHMAN

*Attesting Officer*   *Commissioner of Patents and Trademarks*